United States Patent
Zajaczkowski et al.

(10) Patent No.: US 10,737,459 B2
(45) Date of Patent: *Aug. 11, 2020

(54) HYDRAULICALLY TREATED NONWOVEN FABRICS AND METHOD OF MAKING THE SAME

(71) Applicant: FIRST QUALITY NONWOVENS, INC., Great Neck, NY (US)

(72) Inventors: Peter Zajaczkowski, Greenville, SC (US); John C. Parsons, Dallas, PA (US); Karthik Ramaratnam, Anderson, SC (US)

(73) Assignee: PFNONWOVENS LLC, Hazelton, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/842,644

(22) Filed: Dec. 14, 2017

(65) Prior Publication Data

US 2018/0169995 A1    Jun. 21, 2018

Related U.S. Application Data

(60) Provisional application No. 62/434,204, filed on Dec. 14, 2016.

(51) Int. Cl.
*B32B 3/24* (2006.01)
*B32B 5/02* (2006.01)
(Continued)

(52) U.S. Cl.
CPC .............. *B32B 3/266* (2013.01); *B32B 5/022* (2013.01); *B32B 5/26* (2013.01); *B32B 7/022* (2019.01); *B32B 7/04* (2013.01); *B32B 38/0012* (2013.01); *D04H 3/007* (2013.01); *D04H 3/11* (2013.01); *D04H 3/14* (2013.01); *D06B 1/02* (2013.01); *B32B 5/08* (2013.01); *B32B 37/10* (2013.01);
(Continued)

(58) Field of Classification Search
None
See application file for complete search history.

(56) References Cited

U.S. PATENT DOCUMENTS 3,639,199 A * 2/1972 Brandts .................. B32B 27/00
428/110
4,808,467 A    2/1989 Suskind et al.
(Continued)

FOREIGN PATENT DOCUMENTS

DE       3917791 A1 * 12/1990 .......... A61F 13/5116
DE    19846857 C1 *  3/2000 ............. D04H 3/011
(Continued)

OTHER PUBLICATIONS

International Search Report and Written Opinion of PCT/US17/66520 dated Feb. 14, 2018.

*Primary Examiner* — Jeffrey A Vonch
(74) *Attorney, Agent, or Firm* — Amster, Rothstein & Ebenstein LLP

(57) ABSTRACT

A nonwoven laminate having a SMS structure is hydraulically treated by particular process parameters to improve softness and tactile feel. The nonwoven laminate may also be imparted with one or more regular aperture patterns by additional hydraulic treatment processes, where the initial hydraulic treatment provides for improved aperture definition.

11 Claims, 21 Drawing Sheets

(51) Int. Cl.

| | | |
|---|---|---|
| *B32B 5/26* | (2006.01) | |
| *B32B 7/04* | (2019.01) | |
| *B32B 38/00* | (2006.01) | |
| *D04H 3/007* | (2012.01) | |
| *D04H 3/11* | (2012.01) | |
| *D04H 3/14* | (2012.01) | |
| *B32B 3/26* | (2006.01) | |
| *B32B 7/022* | (2019.01) | |
| *D06B 1/02* | (2006.01) | |
| *D06C 29/00* | (2006.01) | |
| *B32B 5/08* | (2006.01) | |
| *D04H 3/147* | (2012.01) | |
| *B32B 38/04* | (2006.01) | |
| *B32B 37/10* | (2006.01) | |

(52) U.S. Cl.
CPC ..... *B32B 2038/047* (2013.01); *B32B 2250/03* (2013.01); *B32B 2250/20* (2013.01); *B32B 2250/242* (2013.01); *B32B 2250/40* (2013.01); *B32B 2262/0253* (2013.01); *B32B 2262/12* (2013.01); *B32B 2307/546* (2013.01); *B32B 2307/554* (2013.01); *B32B 2307/718* (2013.01); *B32B 2307/726* (2013.01); *B32B 2307/732* (2013.01); *B32B 2307/746* (2013.01); *B32B 2555/02* (2013.01); *D04H 3/147* (2013.01); *D06C 29/005* (2013.01); *D10B 2321/021* (2013.01); *D10B 2403/0213* (2013.01); *D10B 2509/026* (2013.01); *Y10T 428/24322* (2015.01); *Y10T 428/24826* (2015.01); *Y10T 442/637* (2015.04); *Y10T 442/662* (2015.04); *Y10T 442/663* (2015.04); *Y10T 442/666* (2015.04); *Y10T 442/671* (2015.04); *Y10T 442/68* (2015.04); *Y10T 442/681* (2015.04); *Y10T 442/689* (2015.04)

(56) References Cited

U.S. PATENT DOCUMENTS

| | | | | |
|---|---|---|---|---|
| 4,879,170 A * | 11/1989 | Radwanski | ............... | D04H 1/56 442/329 |
| 4,931,355 A * | 6/1990 | Radwanski | ............... | D04H 5/02 28/104 |
| 5,023,130 A * | 6/1991 | Simpson | .................. | D04H 1/49 442/408 |
| 5,165,979 A * | 11/1992 | Watkins | .................... | B32B 5/26 428/113 |
| 5,188,885 A * | 2/1993 | Timmons | .................. | B32B 5/26 428/198 |
| 5,204,158 A * | 4/1993 | Phillips | .................. | D04H 18/04 28/104 |
| 5,204,174 A * | 4/1993 | Daponte | .................. | B32B 5/26 156/308.2 |
| 5,336,552 A * | 8/1994 | Strack | .................... | D04H 1/559 442/361 |
| 5,369,858 A | 12/1994 | Gilmore et al. | | |
| 5,589,258 A * | 12/1996 | Maddern | .................. | B32B 5/26 442/382 |
| 5,652,051 A * | 7/1997 | Shawver | .................... | D01F 6/30 442/362 |
| 5,683,794 A * | 11/1997 | Wadsworth | ............... | B32B 5/26 442/382 |
| 5,766,737 A | 6/1998 | Willey et al. | | |
| 5,770,531 A * | 6/1998 | Sudduth | .................. | A61L 15/26 442/361 |
| 5,874,159 A * | 2/1999 | Cruise | .................... | B32B 5/26 428/198 |
| 5,885,267 A * | 3/1999 | Mishima | ............... | A61F 13/512 604/378 |
| 5,964,742 A * | 10/1999 | McCormack | ............ | D04H 1/54 604/380 |
| 6,015,605 A * | 1/2000 | Tsujiyama | .......... | A61F 13/4753 428/195.1 |
| 6,177,370 B1 * | 1/2001 | Skoog | ........................ | B32B 5/26 442/387 |
| 6,286,145 B1 * | 9/2001 | Welchel | .................. | A41D 31/02 2/69 |
| 6,635,715 B1 * | 10/2003 | Datta | ........................ | C08L 23/14 525/240 |
| 6,723,669 B1 * | 4/2004 | Clark | ........................ | D04H 3/16 442/329 |
| 6,797,377 B1 * | 9/2004 | DeLucia | .................. | D04H 3/00 428/372 |
| 8,510,922 B2 | 8/2013 | Turi et al. | | |
| 2002/0028623 A1 * | 3/2002 | Carlson | .................... | D04H 3/02 442/361 |
| 2002/0119720 A1 * | 8/2002 | Arora | ................ | A61F 13/15707 442/327 |
| 2003/0013371 A1 * | 1/2003 | Dorsey | .................... | D01F 6/62 442/401 |
| 2003/0032355 A1 * | 2/2003 | Guckert | ............... | A47G 9/0238 442/327 |
| 2004/0048542 A1 * | 3/2004 | Thomaschefsky | ..... | D04H 1/425 442/389 |
| 2004/0161992 A1 * | 8/2004 | Clark | ........................ | D04H 3/16 442/340 |
| 2004/0241399 A1 | 12/2004 | Marmon et al. | | |
| 2005/0020170 A1 * | 1/2005 | Deka | ........................ | D04H 1/54 442/327 |
| 2005/0077012 A1 * | 4/2005 | Vuillaume | ............... | D04H 3/10 156/441 |
| 2005/0125908 A1 * | 6/2005 | Pourdeyhimi | ......... | D06C 29/00 8/115.51 |
| 2005/0215155 A1 * | 9/2005 | Young | ................ | A61F 13/15203 442/337 |
| 2005/0244619 A1 * | 11/2005 | Kauschke | ............... | A61F 13/512 428/195.1 |
| 2006/0057921 A1 * | 3/2006 | Turi | ........................ | D04H 3/14 442/327 |
| 2006/0131777 A1 * | 6/2006 | Debyser | .................... | D04H 3/16 264/171.1 |
| 2006/0141886 A1 * | 6/2006 | Brock | ........................ | B32B 5/022 442/382 |
| 2006/0172647 A1 * | 8/2006 | Mehta | ........................ | C08L 23/10 442/327 |
| 2007/0173162 A1 * | 7/2007 | Ethiopia | .................. | C08L 23/10 442/327 |
| 2008/0038982 A1 * | 2/2008 | Motomura | ............... | B32B 5/26 442/382 |
| 2008/0146110 A1 * | 6/2008 | Patel | ........................ | D04H 3/147 442/334 |
| 2008/0268194 A1 * | 10/2008 | Kim | ........................ | D04H 3/14 428/43 |
| 2009/0053959 A1 * | 2/2009 | Datta | ........................ | B32B 5/26 442/328 |
| 2009/0111347 A1 * | 4/2009 | Peng | ........................ | D01F 1/10 442/334 |
| 2009/0259208 A1 | 10/2009 | Hellstrom et al. | | |
| 2010/0015875 A1 * | 1/2010 | Muenstermann | ........ | D04H 3/11 442/408 |
| 2010/0048072 A1 * | 2/2010 | Kauschke | ............... | A47L 13/16 442/1 |
| 2010/0112273 A1 * | 5/2010 | Pedoja | .................. | D04H 1/4382 428/91 |
| 2010/0130086 A1 * | 5/2010 | Dorsey | .................... | D04H 5/02 442/402 |
| 2010/0324515 A1 * | 12/2010 | Boscolo | .................. | D04H 3/016 604/367 |
| 2011/0064928 A1 * | 3/2011 | Bonneh | .................. | B01D 39/1623 428/212 |
| 2011/0196327 A1 * | 8/2011 | Chhabra | ............... | A61F 13/4942 604/367 |
| 2011/0217894 A1 * | 9/2011 | Coslett | .................... | D04H 3/14 442/382 |

(56) References Cited

U.S. PATENT DOCUMENTS

| | | | |
|---|---|---|---|
| 2012/0045956 A1* | 2/2012 | Tau | C08L 23/10 |
| | | | 442/181 |
| 2012/0046400 A1* | 2/2012 | Kaarto | C08L 23/10 |
| | | | 524/210 |
| 2012/0164908 A1 | 6/2012 | Kunimoto | |
| 2012/0189814 A1* | 7/2012 | Coslett | B29C 59/04 |
| | | | 428/156 |
| 2012/0271265 A1* | 10/2012 | Langdon | B32B 3/10 |
| | | | 604/385.16 |
| 2013/0115843 A1* | 5/2013 | Klaska | D01F 1/10 |
| | | | 442/392 |
| 2013/0237111 A1 | 9/2013 | Crown et al. | |
| 2013/0239283 A1* | 9/2013 | Yokoyama | D01F 6/06 |
| | | | 2/9 |
| 2014/0039434 A1* | 2/2014 | Xu | A61F 13/538 |
| | | | 604/368 |
| 2014/0072767 A1* | 3/2014 | Klaska | D04H 1/544 |
| | | | 428/156 |
| 2014/0099469 A1* | 4/2014 | Abuto | A61Q 19/00 |
| | | | 428/88 |
| 2014/0155854 A1* | 6/2014 | MacDonald | D04H 1/435 |
| | | | 604/372 |
| 2014/0248811 A1* | 9/2014 | Degroot | B32B 5/24 |
| | | | 442/170 |
| 2015/0100034 A1* | 4/2015 | Ponomarenko | A61F 13/511 |
| | | | 604/365 |
| 2015/0267327 A1* | 9/2015 | Kanya | D04H 1/4291 |
| | | | 428/172 |
| 2015/0308039 A1* | 10/2015 | Bonaboglia | B32B 5/022 |
| | | | 428/219 |
| 2016/0251788 A1* | 9/2016 | Huang | D04H 1/4291 |
| | | | 442/382 |
| 2016/0263271 A1 | 9/2016 | Huang et al. | |
| 2016/0362825 A1* | 12/2016 | Novarino | D04H 1/559 |
| 2017/0016158 A1* | 1/2017 | Burgess | A61F 13/00 |
| 2017/0029994 A1* | 2/2017 | Ashraf | D01D 5/0985 |
| 2017/0137980 A1* | 5/2017 | Kauschke | D04H 1/495 |
| 2017/0191198 A1* | 7/2017 | Ashraf | D04H 3/16 |
| 2017/0203542 A1* | 7/2017 | Ramaratnam | B32B 5/26 |
| 2017/0233909 A1* | 8/2017 | Wright | D04H 1/425 |
| | | | 428/172 |
| 2017/0260665 A1* | 9/2017 | Kauschke | D04H 3/005 |
| 2017/0304481 A1* | 10/2017 | Kupelian | A61L 15/20 |
| 2017/0314174 A1* | 11/2017 | Ichikawa | D04H 1/559 |
| 2018/0002846 A1* | 1/2018 | Novarino | D04H 3/14 |
| 2018/0133062 A1* | 5/2018 | Koizumi | D04H 1/06 |
| 2018/0178486 A1* | 6/2018 | Mecl | D04H 3/007 |

FOREIGN PATENT DOCUMENTS

| | | | | |
|---|---|---|---|---|
| JP | 2005177176 A | * | 7/2005 | |
| JP | 2011058157 A | * | 3/2011 | |
| WO | WO-9932699 A1 | * | 7/1999 | ............ A61F 13/513 |
| WO | 01/38091 A1 | | 5/2001 | |
| WO | WO-2014044235 A1 | * | 3/2014 | ............... D01F 6/30 |
| WO | WO-2014071897 A1 | * | 5/2014 | ......... A61F 13/51121 |
| WO | 2016/022880 A1 | | 2/2016 | |
| WO | 2016/073736 A1 | | 5/2016 | |

* cited by examiner

| T# | Description | BW, gsm | Speed, mpm | C1 (2 injectors) | | |
|---|---|---|---|---|---|---|
| | | | | Strip | Pressure, bar | Screen |
| 1 | Material 1 (30 gsm SMS, 30 % MB, medium bonded) | 30 | | | | |
| 1.48 | Material 1 (30 gsm SMS, 30 % MB, medium bonded) | 30 | 200 | 2Rb | 80 | 80 | MSD |
| 1.49 | Material 1 (30 gsm SMS, 30 % MB, medium bonded) | 30 | 200 | 2Rb | 80 | 120 | MSD |
| 1.5 | Material 1 (30 gsm SMS, 30 % MB, medium bonded) | 30 | 200 | 2Rb | 80 | 160 | MSD |
| 4b | Material 4b (30 gsm SMS, 5% MB, Well-bonded) | 30 | | | | |
| 4b.9 | Material 4b (30 gsm SMS, 5% MB, Well-bonded) | 30 | 200 | 2Rb | 80 | 80 | MSD |
| 4b.10 | Material 4b (30 gsm SMS, 5% MB, Well-bonded) | 30 | 200 | 2Rb | 80 | 120 | MSD |
| 4b.11 | Material 4b (30 gsm SMS, 5% MB, Well-bonded) | 30 | 200 | 2Rb | 80 | 160 | MSD |
| 4a | Material 4a (30 gsm SMS, 5% MB, tack-bonded) | 30 | | | | |
| 4a.14 | Material 4a (30 gsm SMS, 5% MB, tack-bonded) | 30 | 200 | 2Rb | 80 | 80 | MSD |
| 4a.15 | Material 4a (30 gsm SMS, 5% MB, tack-bonded) | 30 | 200 | 2Rb | 80 | 120 | MSD |
| 4a.16 | Material 4a (30 gsm SMS, 5% MB, tack-bonded) | 30 | 200 | 2Rb | 80 | 160 | MSD |
| 2 | Material 2 (30 gsm SMS, 30% MB, tack-bonded) | 30 | | | | |
| 2.16 | Material 2 (30 gsm SMS, 30% MB, tack-bonded) | 30 | 200 | 2Rb | 80 | 80 | MSD |
| 2.17 | Material 2 (30 gsm SMS, 30% MB, tack-bonded) | 30 | 200 | 2Rb | 80 | 120 | MSD |
| 2.18 | Material 2 (30 gsm SMS, 30% MB, tack-bonded) | 30 | 200 | 2Rb | 80 | 160 | MSD |
| 3 | Material 3 (30 gsm SMS, 12% MB, tack-bonded) | 30 | | | | |
| 3.8 | Material 3 (30 gsm SMS, 12% MB, tack-bonded) | 30 | 200 | 2Rb | 80 | 80 | MSD |
| 3.9 | Material 3 (30 gsm SMS, 12% MB, tack-bonded) | 30 | 200 | 2Rb | 80 | 120 | MSD |
| 3.1 | Material 3 (30 gsm SMS, 12% MB, tack-bonded) | 30 | 200 | 2Rb | 80 | 160 | MSD |

FIG. 3A

| T# | C2 (2 injectors) | | | C3 (2 injectors) | | | Dryer |
|---|---|---|---|---|---|---|---|
| | Strip | Pressure, bar | Screen | Strip | Pressure, bar | Screen | |
| 1 | | | | | | | |
| 1.48 | 2Rb | 80 | 80 | MSD | 2Rb | 80 | 80 | MSD | no |
| 1.49 | 2Rb | 120 | 120 | MSD | 2Rb | 120 | 120 | MSD | no |
| 1.5 | 2Rb | 160 | 160 | MSD | 2Rb | 160 | 160 | MSD | no |
| 4b | | | | | | | |
| 4b.9 | 2Rb | 80 | 80 | MSD | 2Rb | 80 | 80 | MSD | no |
| 4b.10 | 2Rb | 120 | 120 | MSD | 2Rb | 120 | 120 | MSD | no |
| 4b.11 | 2Rb | 160 | 160 | MSD | 2Rb | 160 | 160 | MSD | no |
| 4a | | | | | | | |
| 4a.14 | 2Rb | 80 | 80 | MSD | 2Rb | 80 | 80 | MSD | no |
| 4a.15 | 2Rb | 120 | 120 | MSD | 2Rb | 120 | 120 | MSD | no |
| 4a.16 | 2Rb | 160 | 160 | MSD | 2Rb | 160 | 160 | MSD | no |
| 2 | | | | | | | |
| 2.16 | 2Rb | 80 | 80 | MSD | 2Rb | 80 | 80 | MSD | no |
| 2.17 | 2Rb | 120 | 120 | MSD | 2Rb | 120 | 120 | MSD | no |
| 2.18 | 2Rb | 160 | 160 | MSD | 2Rb | 160 | 160 | MSD | no |
| 3 | | | | | | | |
| 3.8 | 2Rb | 80 | 80 | MSD | 2Rb | 80 | 80 | MSD | no |
| 3.9 | 2Rb | 120 | 120 | MSD | 2Rb | 120 | 120 | MSD | no |
| 3.1 | 2Rb | 160 | 160 | MSD | 2Rb | 160 | 160 | MSD | no |

FIG. 3B

| T# | BW, gsm | AP, cfm | Thickness, mm | CDT, N/cm | MD HOM, g | CD HOM, g | Avg HOM, g | Kinetic CoF | Abrasion Rating |
|---|---|---|---|---|---|---|---|---|---|
| 1 | 31.4 | 64 | 0.300 | 4.7 | 22.2 | 13.8 | 18.0 | - | 1.0 |
| 1.48 | 32.0 | 122 | 0.425 | 3.3 | 16.3 | 7.9 | 12.1 | 0.56 | 1.0 |
| 1.49 | 32.8 | 255 | 0.495 | 6.0 | 13.2 | 6.4 | 9.8 | 1.06 | 1.0 |
| 1.5 | 32.0 | 313 | 0.518 | 7.4 | 14.8 | 7.2 | 11.0 | 0.95 | 4.7 |
| 4b | 25.3 | 345 | 0.274 | 5.2 | 6.5 | 3.7 | 5.1 | - | 1.0 |
| 4b.9 | 31.4 | 315 | 0.284 | 6.6 | 6.7 | 3.4 | 5.1 | 0.54 | 5.0 |
| 4b.10 | 32.7 | 358 | 0.320 | 6.7 | 7.0 | 3.3 | 5.2 | 0.67 | 5.0 |
| 4b.11 | 32.5 | 399 | 0.358 | 6.5 | 7.3 | 3.6 | 5.5 | 0.69 | 5.0 |
| 4a | 21.3 | 852 | 0.490 | 3.1 | 4.4 | 3.2 | 3.8 | - | 1.0 |
| 4a.14 | 32.2 | 443 | 0.326 | 1.8 | 5.7 | 3.1 | 4.4 | 0.52 | 2.2 |
| 4a.15 | 33.3 | 446 | 0.370 | 5.0 | 5.8 | 3.1 | 4.4 | 0.69 | 5.0 |
| 4a.16 | 36.1 | 511 | 0.397 | 8.0 | 7.7 | 3.7 | 5.7 | 0.81 | 5.0 |
| 2 | 30.2 | 297 | 0.302 | 1.3 | 6.7 | 4.3 | 5.5 | - | 1.0 |
| 2.16 | 29.3 | 172 | 0.289 | 1.7 | 6.1 | 3.0 | 4.5 | 0.64 | 4.6 |
| 2.17 | 32.8 | 315 | 0.390 | 5.1 | 6.3 | 2.8 | 4.5 | 0.74 | 4.6 |
| 2.18 | 32.0 | 356 | 0.371 | 4.7 | 6.4 | 3.0 | 4.7 | 0.81 | 5.0 |
| 3 | 31.6 | 75 | 0.291 | 2.8 | 7.8 | 4.8 | 6.3 | - | 1.0 |
| 3.8 | 31.7 | 247 | 0.301 | 2.1 | 6.4 | 3.1 | 4.8 | 0.60 | 4.6 |
| 3.9 | 32.2 | 367 | 0.345 | 3.7 | 6.4 | 3.1 | 4.7 | 0.78 | 5.0 |
| 3.1 | 35.4 | 383 | 0.396 | 5.8 | 6.9 | 3.0 | 4.9 | 0.86 | 5.0 |

FIG. 3C

Trial 4b.9

Trial 4b.10

Trial 4b.11

| T# | Description | BW, gsm | Speed, mpm | C1 (2 injectors) | | |
|---|---|---|---|---|---|---|
| | | | | Strip | Pressures | Screen |
| 1.16 | Material 1 (30 gsm SMS, 30 % MB, medium bonded) | 30 | 50 | | | |
| 1.41Dryer | Material 1 (30 gsm SMS, 30 % MB, medium bonded) | 30 | 200 | 1R | 200 | 150 | MSD |
| 1.42Dryer | Material 1 (30 gsm SMS, 30 % MB, medium bonded) | 30 | 200 | 1R | 200 | 150 | MSD |
| 4a.9 | Material 4a (30 gsm SMS, 5% MB, tack-bonded) | 30 | 50 | 1R | 60 | 80 | MSD |
| 4a.13 | Material 4a (30 gsm SMS, 5% MB, tack-bonded) | 30 | 50 | 1R | 60 | 80 | MSD |
| 2.4 | Material 2 (30 gsm SMS, 30% MB, tack-bonded) | 30 | 50 | 1R | 60 | 80 | MSD |
| 2.12 | Material 2 (30 gsm SMS, 30% MB, tack-bonded) | 30 | 50 | 1R | 60 | 60 | MSD |
| 3.7 | Material 3 (30 gsm SMS, 12% MB, tack-bonded) | 30 | 50 | 1R | 60 | 80 | MSD |
| 5.3 | Material 5 (35 gsm SB Fleece, 45N/mm tack-bonded) | 35 | 50 | | | |
| 5.6 | Material 5 (35 gsm SB Fleece, 45N/mm tack-bonded) | 35 | 200 | 1R | 100 | 150 | MSD |
| 5.6Dry | Material 5 (35 gsm SB Fleece, 45N/mm tack-bonded) | 35 | 200 | 1R | 100 | 150 | MSD |
| 5.10 | Material 5 (35 gsm SB Fleece, 45N/mm tack-bonded) | 35 | 250 | | | |
| 5.13 | Material 5 (35 gsm SB Fleece, 45N/mm tack-bonded) | 35 | 50 | 1R | 80 | 100 | MSD |
| 5.14 | Material 5 (35 gsm SB Fleece, 45N/mm tack-bonded) | 35 | 50 | 1R | 80 | 100 | MSD |
| 5.15Dry | Material 5 (35 gsm SB Fleece, 45N/mm tack-bonded) | 35 | 200 | 1R | 100 | 150 | MSD |

FIG. 5A

| T# | C2 (2 injectors) | | | C3 (2 injectors) | | | Dryer | Size | Rating |
|---|---|---|---|---|---|---|---|---|---|
| | Strip | Pressure | Screen | Strip | Pressure | Screen | | | |
| 1.16 | | | | 2R | 220 | 250 | AS3 | no | 3x2 | 3 |
| 1.41Dryer | 1R | 200 | 150 | MSD | 2R | 200 | 200 | AS1 | 115 | 1x0.5 | 4 |
| 1.42Dryer | 1R | 200 | 150 | MSD | 2R | 200 | 200 | AS2 | 115 | 0.9x1.5 | |
| 4a.9 | 1R | 80 | 80 | MSD | 2R | 150 | 150 | AS2 | no | 0.9x1.5 | 3 |
| 4a.13 | 1R | 80 | 80 | MSD | 2R | 180 | 180 | AS3 | no | 3x2 | 3 |
| 2.4 | 1R | 80 | 80 | MSD | 2R | 100 | 100 | AS1 | no | 1x0.5 | 3 |
| 2.12 | 1R | 60 | 60 | MSD | 2R | 100 | 100 | AS1 | no | 1x0.5 | 3 |
| 3.7 | 1R | 80 | 80 | MSD | 2R | 150 | 150 | AS2 | no | 0.9x1.5 | 3 |
| 5.3 | | | | 2R | 230 | 250 | AS1 | no | 1x0.5 | 4 |
| 5.6 | 1R | 150 | 150 | MSD | 2R | 200 | 200 | AS1 | no | 1x0.5 | 4 |
| 5.6Dry | 1R | 150 | 150 | MSD | 2R | 200 | 200 | AS1 | 115 | 1x0.5 | 4 |
| 5.10 | 1R | 150 | 150 | MSD | 2R | 200 | 200 | AS1 | no | 1x0.5 | 4 |
| 5.13 | 1R | 100 | 100 | MSD | 2R | 200 | 200 | AS2 | no | 0.9x1.5 | 4 |
| 5.14 | 1R | 100 | 100 | MSD | 2R | 200 | 200 | AS3 | no | 3x2 | 4 |
| 5.15Dry | 1R | 150 | 150 | MSD | 2R | 200 | 200 | AS2 | 115 | 0.9x1.5 | 4 |

FIG. 5B

| T# | BW, gsm | AP, cfm | Thickness, mm | CDT, N/cm | CDE, % | MD HOM, g | CD HOM, g | Avg HOM, g | Kinetic CoF | Visual Abrasion |
|---|---|---|---|---|---|---|---|---|---|---|
| 1.16 | 29 | 897 | 0.73 | 6.21 | 131 | 10.64 | 6.05 | 8.35 | 0.96 | 3 |
| 1.41Dryer | 31 | 545 | 0.49 | 5.84 | 136 | 11.79 | 3.84 | 7.82 | 1.12 | 3 |
| 1.42Dryer | 30 | 617 | 0.56 | 6.24 | 132 | 10.21 | 4.3 | 7.26 | 1.45 | 3 |
| 4a.9 | 30 | 813 | 0.55 | 6.19 | 139 | 6.43 | 3.94 | 5.19 | 1.16 | 3 |
| 4a.13 | 31 | 1033 | 0.71 | 5.69 | 140 | 8.65 | 4.76 | 6.71 | 0.93 | 3 |
| 2.4 | 28 | 485 | 0.47 | 3.13 | 143 | 6.76 | 3.82 | 5.29 |  | 4 |
| 2.12 | 28 | 624 | 0.52 | 1.93 | 104 | 6.6 | 3.9 | 5.25 | 0.99 | 3 |
| 3.7 | 30 | 823 | 0.55 | 4.89 | 155 | 6.1 | 3.24 | 4.67 | 1.25 | 3 |
| 5.3 | 33 | 770 | 0.7 | 8.25 | 124 | 11.5 | 8.26 | 9.88 | 0.85 | 1 |
| 5.6 | 37 | 622 | 0.63 | 10.6 | 142 | 17.18 | 9.34 | 13.26 | 0.88 | 3 |
| 5.6Dry | 38 | 555 | 0.59 | 10.2 | 133 | 15.9 | 4.84 | 10.37 | 0.92 | 4 |
| 5.10 | 35 | 685 | 0.69 | 9.62 | 138 | 13.66 | 9.11 | 11.39 | 0.82 | 1 |
| 5.13 | 36 | 658 | 0.59 | 10.3 | 132 | 14.69 | 7.66 | 11.18 | 1.01 | 2 |
| 5.14 | 39 | 751 | 0.72 | 10.16 | 135 | 18.01 | 17.88 | 17.95 | 1.11 | 2 |
| 5.15Dry | 39 | 570 | 0.62 | 9.08 | 113 | 15.33 | 5.61 | 10.47 | 0.85 | 2 |

FIG. 5C

| Base Nonwoven | Jet Strip | Injector Pressures, bar | Screen | Basis Weight, gsm |
|---|---|---|---|---|
| 22 gsm Soft SMS, 5% MB, Well-bonded | 2RB | 0 | MSD | 21.9 |
| 22 gsm Soft SMS, 5% MB, Well-bonded | 2RB | 4 x 80 | MSD | 23.4 |
| 22 gsm Soft SMS, 5% MB, Well-bonded | 2RB | 4 x 120 | MSD | 23.5 |
| 22 gsm Soft SMS, 5% MB, Well-bonded | 2RB | 4 x 160 | MSD | 23.6 |
| 22 gsm Soft SMS, 5% MB, Well-bonded | 2RB | 4 x 200 | MSD | 25.9 |
| 22 gsm Soft SMS 1, 5% MB, Well-bonded | 2RB | 4 x 80 | MSD | 24.4 |
| 22 gsm Soft SMS 1, 5% MB, Well-bonded | 2RB | 4 x 160 | MSD | 24.0 |
| 22 gsm Soft SMS 2, 5% MB, Well-bonded | 2RB | 4 x 80 | MSD | 23.4 |
| 22 gsm Soft SMS 2, 5% MB, Well-bonded | 2RB | 4 x 200 | MSD | 24.6 |

FIG. 8A

| Base Nonwoven | Thickness, mm | Density, g/cc | AirPerm, cfm |
|---|---|---|---|
| 22 gsm Soft SMS, 5% MB, Well-bonded | 0.222 | 0.099 | 327.0 |
| 22 gsm Soft SMS, 5% MB, Well-bonded | 0.178 | 0.132 | 402.2 |
| 22 gsm Soft SMS, 5% MB, Well-bonded | 0.194 | 0.121 | 446.2 |
| 22 gsm Soft SMS, 5% MB, Well-bonded | 0.200 | 0.118 | 556.2 |
| 22 gsm Soft SMS, 5% MB, Well-bonded | 0.227 | 0.114 | 523.2 |
| 22 gsm Soft SMS 1, 5% MB, Well-bonded | 0.189 | 0.129 | 356.1 |
| 22 gsm Soft SMS 1, 5% MB, Well-bonded | 0.228 | 0.105 | 476.2 |
| 22 gsm Soft SMS 2, 5% MB, Well-bonded | 0.181 | 0.129 | 335.1 |
| 22 gsm Soft SMS 2, 5% MB, Well-bonded | 0.215 | 0.114 | 383.2 |

FIG. 8B

| Base Nonwoven | MD Tensile, N/cm | MD Elongation, % | CD Tensile, N/cm | CD Elongation, % |
|---|---|---|---|---|
| 22 gsm Soft SMS, 5% MB, Well-bonded | 8.21 | 86.00 | 5.29 | 94.90 |
| 22 gsm Soft SMS, 5% MB, Well-bonded | 8.48 | 36.64 | 3.42 | 70.60 |
| 22 gsm Soft SMS, 5% MB, Well-bonded | 7.05 | 31.94 | 2.61 | 65.57 |
| 22 gsm Soft SMS, 5% MB, Well-bonded | 6.05 | 28.45 | 2.21 | 65.06 |
| 22 gsm Soft SMS, 5% MB, Well-bonded | 5.79 | 23.03 | 1.90 | 94.00 |
| 22 gsm Soft SMS 1, 5% MB, Well-bonded | 8.55 | 36.50 | 3.23 | 72.80 |
| 22 gsm Soft SMS 1, 5% MB, Well-bonded | 7.62 | 31.38 | 2.60 | 77.66 |
| 22 gsm Soft SMS 2, 5% MB, Well-bonded | 8.64 | 34.04 | 3.28 | 73.54 |
| 22 gsm Soft SMS 2, 5% MB, Well-bonded | 7.24 | 29.17 | 2.83 | 82.40 |

FIG. 8C

| Base Nonwoven | MD HOM, g | CD HOM, g | Average H-O-M, g |
|---|---|---|---|
| 22 gsm Soft SMS, 5% MB, Well-bonded | 5.4 | 3.5 | 4.4 |
| 22 gsm Soft SMS, 5% MB, Well-bonded | 5.1 | 1.4 | 3.3 |
| 22 gsm Soft SMS, 5% MB, Well-bonded | 4.3 | 1.5 | 2.9 |
| 22 gsm Soft SMS, 5% MB, Well-bonded | 4.2 | 1.2 | 2.7 |
| 22 gsm Soft SMS, 5% MB, Well-bonded | 4.6 | 1.0 | 2.8 |
| 22 gsm Soft SMS 1, 5% MB, Well-bonded | 5.0 | 1.4 | 3.2 |
| 22 gsm Soft SMS 1, 5% MB, Well-bonded | 4.7 | 1.2 | 2.9 |
| 22 gsm Soft SMS 2, 5% MB, Well-bonded | 4.9 | 1.7 | 3.3 |
| 22 gsm Soft SMS 2, 5% MB, Well-bonded | 4.9 | 1.6 | 3.2 |

FIG. 8D

| Base Nonwoven | Kinetic CoF | Opacity, % | Visual Abrasion, 80 cycles |
|---|---|---|---|
| 22 gsm Soft SMS, 5% MB, Well-bonded | 0.25 | 42.5 | 4.9 |
| 22 gsm Soft SMS, 5% MB, Well-bonded | 0.39 | 43.6 | 4.9 |
| 22 gsm Soft SMS, 5% MB, Well-bonded | 0.51 | 42.6 | 5.0 |
| 22 gsm Soft SMS, 5% MB, Well-bonded | 0.57 | 43.7 | 5.0 |
| 22 gsm Soft SMS, 5% MB, Well-bonded | 0.64 | 47.0 | 5.0 |
| 22 gsm Soft SMS 1, 5% MB, Well-bonded | 0.41 | 41.9 | 5.0 |
| 22 gsm Soft SMS 1, 5% MB, Well-bonded | 0.54 | 43.5 | 5.0 |
| 22 gsm Soft SMS 2, 5% MB, Well-bonded | 0.42 | 45.4 | 5.0 |
| 22 gsm Soft SMS 2, 5% MB, Well-bonded | 0.60 | 42.6 | 5.0 |

FIG. 8E

HYDRAULICALLY TREATED NONWOVEN FABRICS AND METHOD OF MAKING THE SAME

FIELD OF THE INVENTION

The present invention relates to hydraulically treated nonwovens and an improved method of manufacturing hydraulically treated nonwovens.

BACKGROUND OF THE INVENTION

Continued improvements in hydraulically treated nonwoven fabrics is of interest in personal care products (e.g. baby diapers, feminine care, adult products) both for functional and perceptual reasons. In particular, abrasion resistance and softness are properties that are of interest. However, improvements that provide abrasion resistance generally decrease softness and improvements that improve softness generally decrease abrasion resistance. Accordingly, a nonwoven fabric that combines both abrasion resistance and softness is desired.

SUMMARY OF THE INVENTION

The present invention is directed to an improved method of using high pressure water jets to treat and to form apertures in spunmelt nonwoven fabrics. The hydraulically treated or apertured nonwoven fabrics may be used, for example, with disposable absorbent articles, such as disposable diapers, incontinence and feminine care products, and disposable products for the medical and other industries.

In an exemplary embodiment, a nonwoven composite fabric includes at least first and second nonwoven webs made from spunbond fibers; and a third nonwoven web made from meltblown fibers located between the first and second webs and thermally bonded to the first and second webs, the composite nonwoven fabric being hydraulically treated, wherein the nonwoven composite fabric has a high degree of abrasion resistance and softness.

In an exemplary embodiment, a nonwoven laminate comprises a first nonwoven web comprised substantially of meltblown fibers and a second nonwoven web comprised substantially of spunbond fibers, wherein the nonwoven laminate comprises a regular bond pattern and a regular aperture pattern, wherein the apertures of the regular aperture pattern have a mean diameter of 500-5000 microns.

In an exemplary embodiment, the nonwoven laminate further comprises a regular bond pattern having a percentage bond area of 10% or greater.

In at least one embodiment, the nonwoven laminate is hydroengorged.

In an exemplary embodiment, the nonwoven laminate further comprises a regular aperture pattern having a percentage aperture area of greater than 25%, wherein the ratio of percentage bond area to percentage aperture area is 1:2.

In an exemplary embodiment, a nonwoven laminate comprises a first nonwoven web comprised substantially of meltblown fibers and a second nonwoven web comprised substantially of spunbond fibers, the nonwoven laminate being hydraulically treated, the nonwoven laminate being apertured with a regular aperture pattern, and the nonwoven laminate having an abrasion rating of 3.0 or higher.

In an exemplary embodiment, a process of manufacturing a nonwoven fabric, comprises bonding one or more webs comprised substantially of spunbond fibers to a web comprised substantially of meltblown fibers, said bonding comprising a regular bond pattern having a percentage bond area of 15% or greater; and hydraulically treating the bonded webs by a plurality of steps of water injection, each over a corresponding screen having a predetermined pattern, said plurality of water injection steps comprising: a first water injection step of exposing said bonded webs to a plurality of water jets at a first pressure range of about 80-160 bars; a second water injection step of exposing said bonded webs to a plurality of water jets at a second pressure range of about 80-160 bars; and a third water injection step of exposing said bonded webs to a plurality of water jets at a third pressure range of about 80-160 bars, wherein said first water injection step further comprises maintaining a subset of said plurality of water jets at 80 bars, and wherein said bonded webs comprise about 5% meltblown fibers by weight.

In an exemplary embodiment, the process of manufacturing a nonwoven fabric further comprises bonding being performed by calendering with an engraved roll at 152° C., a smooth roll at 152° C., and a pressure between the engraved roll and the smooth roll at 90 N/mm.

In at least one embodiment, a first aperture pattern is anisotropic.

In at least one embodiment, the nonwoven laminate includes a second aperture pattern.

In at least one embodiment, the second pattern is registered with the first pattern.

In at least one embodiment, the first polymer component is polypropylene.

In at least one embodiment, the first polymer component is viscose.

In at least one embodiment, the continuous fibers of the first layer include a second polymer component.

In at least one embodiment, the second polymer component is polyethylene.

In at least one embodiment, the continuous fibers of the first layer are bicomponent fibers.

In at least one embodiment, the nonwoven web has a basis weight within the range of 5 gsm to 60 gsm.

In at least one embodiment, meltblown fibers comprise between 2% and 35% of the total weight of the web.

In at least one embodiment, the nonwoven laminate further comprises a third layer that comprises a nonwoven web comprising continuous fibers including a first polymer component, the third layer being hydraulically imparted with one or more aperture patterns.

According to an exemplary embodiment of the present invention, a method of making an apertured nonwoven web comprises: forming a first nonwoven web comprising continuous spunbond fibers; forming a second nonwoven web comprising continuous meltblown fibers; bonding the first and second nonwoven webs to form respective first and second layers; hydraulically imparting one or more aperture patterns, from a second layer side, in the first and second layers.

In at least one embodiment, the step of forming a first nonwoven web comprises a spunmelt process.

In at least one embodiment, the second web is a nonwoven web.

In at least one embodiment, the step of forming a second nonwoven web comprises a meltblown process.

In at least one embodiment, the step of imparting the one or more aperture patterns comprises injecting water onto the bonded layers over a drum having a first aperture pattern.

In at least one embodiment, the step of imparting the one or more aperture patterns further comprises injecting water onto the bonded layers over a drum having a second aperture pattern.

In at least one embodiment, the second pattern is registered with the first pattern.

According to an exemplary embodiment of the present invention, a method of making an apertured nonwoven laminate comprises: forming a first nonwoven web comprising continuous spunbond fibers; forming a second nonwoven web comprising continuous meltblown fibers; forming a third nonwoven web comprising continuous spunbond fibers; calender bonding the first, second and third nonwoven webs to form a laminate at a pressure of between 20 newtons per meter (N/m) and 60 N/m, said bonding comprising a regular bond pattern; and hydraulically imparting one or more aperture patterns.

In at least one embodiment, the step of imparting the one or more aperture patterns comprises hydraulically treating the bonded webs by a plurality of steps of water injection, each over a corresponding screen having a predetermined pattern, said plurality of water injection steps comprising: a first water injection step of exposing said bonded webs to a plurality of water jets at a first pressure range of about 80-160 bars; a second water injection step of exposing said bonded webs to a plurality of water jets at a second pressure range of about 80-160 bars; and a third water injection step of exposing said bonded webs to a plurality of water jets at a third pressure range of about 80-160 bars, wherein said first water injection step further comprises maintaining a subset of said plurality of water jets at 80 bars, and wherein said laminate comprises about 5% meltblown fibers by weight. In at least one embodiment, the one or more aperture patterns are registered such that at least a first aperture formed in the nonwoven web by imparting a first aperture pattern is formed in a same location as at least a second aperture formed in the nonwoven web by imparting a second aperture pattern.

In at least one embodiment, the first and second aperture differ in size.

In at least one embodiment, at least a third aperture formed in the nonwoven web by imparting the second aperture pattern is formed in a location where no aperture is formed in the nonwoven web by imparting the first aperture pattern.

In an exemplary embodiment, a nonwoven laminate comprises first and second outer nonwoven layer comprising spunbond fibers, and a third inner nonwoven layer comprising meltblown fibers, wherein the nonwoven laminate is thermally bonded with a regular bond pattern having a percentage bond area of 10% or greater, and the nonwoven laminate includes a plurality of apertures arranged in a regular pattern.

In at least one embodiment, the average diameter of the apertures in the aperture pattern increases along a first direction.

In at least one embodiment, the frequency of apertures in the aperture pattern increases along a first direction.

In an exemplary embodiment, a nonwoven laminate comprises first and second outer nonwoven layer comprising spunbond fibers; and a third inner nonwoven layer comprising meltblown fibers, wherein the nonwoven laminate is thermally bonded with a regular bond pattern having a percentage bond area of 10% or greater, the nonwoven laminate is hydraulically treated, the basis weight of the third inner layer is at least 5 grams per square meter (gsm); and the nonwoven laminate has an abrasion rating of 4.0 or higher and an average Hand-O-Meter measurement (HOM) of 6.0 grams (g) or lower.

In at least one embodiment, the basis weight of the third inner layer is at least 10 grams per square meter.

In at least one embodiment, the spunbond fibers of the first and second outer nonwoven layers comprise polypropylene and at least 5% by weight of a propylene based elastomer; and wherein the nonwoven laminate has an average Hand-O-Meter measurement (HOM) of 6.0 grams (g) or lower.

In at least one embodiment, the fibers of at least one of the nonwoven layers comprises a slip agent.

Other features and advantages of the present invention will become readily apparent from the following detailed description and the accompanying drawings.

BRIEF DESCRIPTION OF THE DRAWINGS

The above and related objects, features and advantages of the present invention will be more fully understood by reference to the following, detailed description of the preferred, albeit illustrative, embodiment of the present invention when taken in conjunction with the accompanying figures, wherein:

FIGS. 3A, 3B, and 3C form a table of selective results for hydraulically-treated nonwovens formed under process parameters and conditions, along with selective ratings of the nonwoven fabrics, in accordance with exemplary embodiments of the present invention;

FIGS. 5A, 5B, and 5C form a table of selective results for hydraulically-apertured nonwovens formed under process parameters and conditions, along with selective ratings of the nonwoven fabrics, according to exemplary embodiments of the present invention;

FIGS. 8A, 8B, 8C, 8D, and 8E form a table of selective testing results of hydraulically-treated nonwovens made in accordance with exemplary embodiments of the invention compared to an untreated nonwoven.

DETAILED DESCRIPTION

Figure 1:
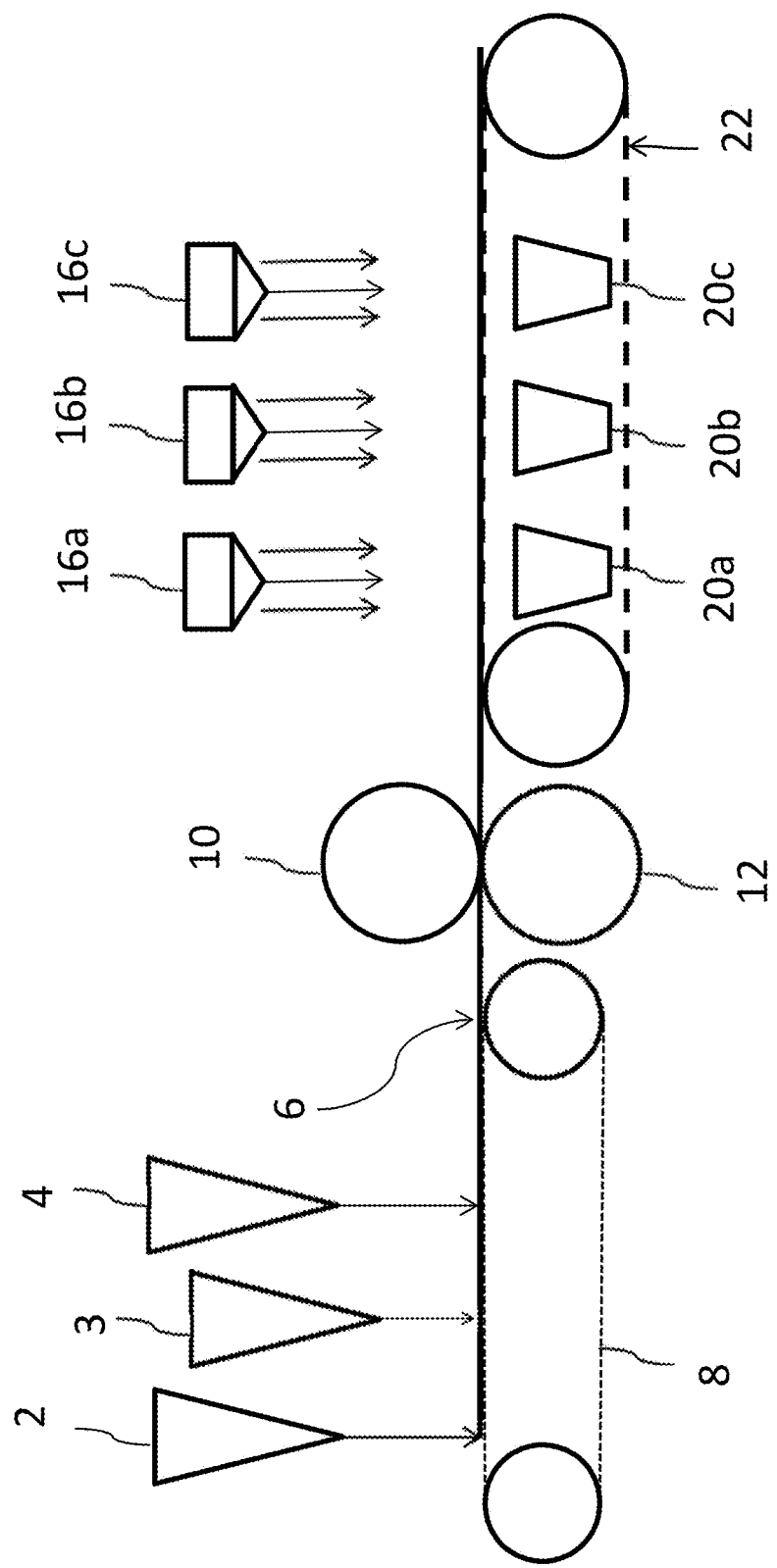
FIG. 1 is a representative diagram of a system for hydraulically treating and aperturing nonwoven fabrics according to a first exemplary embodiment of the present invention.

The present invention is directed to improved techniques for hydraulically treating and imparting apertures to nonwoven fabrics and to nonwoven fabrics made using these methods.

A nonwoven web hydraulically treated and/or formed with an aperture pattern, in accordance with the present invention is especially suitable for use in disposable absorbent articles. As used herein, the term "absorbent article" refers to articles which absorb and contain fluids and solid materials. For example, absorbent articles may be placed against or in proximity to the body to absorb and contain the various exudates discharged by the body. Absorbent articles may be articles that are worn, such as baby diapers, adult incontinence products, and feminine care products, or hygienic products that are used to absorb fluids and solid materials, such as for the medical profession which uses products like disposable gowns and chucks. In particular, the nonwovens may be used as or as part of a body contacting layer such as a topsheet. The nonwovens may also be used for packaging or wrapping items such as absorbent articles. The term "disposable" is used herein to describe absorbent articles which are not intended to be laundered or otherwise restored or reused as an absorbent article, but instead are intended to be discarded after a single use and, preferably, to be recycled, composted or otherwise disposed of in an environmentally compatible manner.

The terms "nonwoven fabric, sheet, layer or web" as used herein means a structure of individual fibers, filaments, or threads that are positioned in a substantially random manner to form a planar material, as opposed to a knitted or woven fabric. Examples of nonwoven fabrics include meltblown webs, spunbond webs, carded webs, air-laid webs, wet-laid webs, and spunlaced webs. A nonwoven composite fabric comprises more than one nonwoven layer.

The term "spunbond fibers" as used herein means substantially continuous fibers or filaments having an average diameter in the range of 10-30 microns. Splittable bicomponent or multicomponent fibers having an average diameter in the range of 10-30 microns prior to splitting are also included.

The term "meltblown fibers" as used herein, means substantially continuous fibers or filaments having an average diameter of less than 10 microns.

An exemplary embodiment of the present invention may include changing the MB and/or SB fiber diameter to further improve the tactile feel of the material without detracting from abrasion performance.

An exemplary embodiment of the present invention includes a multi-layer composite fabric comprising at least one first layer of fibers (preferably meltblown) bonded to at least one second layer of fibers (preferably spunbond) where the median fiber diameter of the second layer of fibers is at least 1.3 times greater than the median fiber diameter of the first layer. An exemplary nonwoven fabric can be formed in-line by sequentially depositing one or more layers of spunbond fibers followed by one or more layers of meltblown fibers on a moving collecting surface. The assembled layers can be thermally bonded by passing them through a calender nip formed between two calender rolls. Each calender roll may be heated or it may be unheated. Each calender roll may have a pattern or it may be smooth. Alternatively, the layers may be bonded ultrasonically, adhesively or through air bonding. In an alternative embodiment, the individual layers can be pre-formed and optionally bonded and collected individually such as by winding the fabrics on wind-up rolls. The individual layers can then be assembled by layering at a later time and bonded together to form a composite fabric.

In embodiments, the base fabric may be an "SMS" structure that may be produced with single or multiple beams of both spunbond and meltblown wherein the fabric has outer spunbond layers and an inner meltblown layer. According to an embodiment of the invention, the base fabric is thermally pattern bonded prior to being hydraulically treated. Without being bound by theory, it is believed that the thermal bonding keeps the fibers relatively fixed in place and thus restricts movement of the fibers caused by the water jets. This in turn causes the meltblown fibers to break or deform while the integrity of the spunbond layers and the thermal bonds stay relatively intact. The broken or deformed meltblown fibers are entangled with the spunbond fibers, however because the thermal bonds are kept intact, the meltblown fibers are still thermally bonded to the base fabric. Without being bound by theory, it is also believed that entanglement of the spunbond fibers with the meltblown fibers results in increased coiling of the spunbond fibers without significant degradation of the spunbond layers. It is also believed that the coiling behavior of the spunbond fibers increases the loft of the material. The hydraulic treatment used to increase loft in this manner, as opposed to increasing entanglement, is known as hydroengorgement. The term "hydroengorgement" as used herein refers to a process by which hydraulic energy is applied to a nonwoven fabric such that there is a resultant increase in caliper as well as in softness, both relative to the nonwoven fabric prior to hydroengorgement. Preferably there is an increase of at least 50% in caliper. The hydroengorgement process is described in detail in U.S. Pat. No. 7,858,544, which is hereby incorporated by reference. Additionally, it is believed that the MB fibers are being shifted towards the outer surface, thereby improving the tactile feel of the material. In an apertured fabric, the entanglement of the meltblown fibers improves the clarity of the edges of the apertures.

An embodiment of the process invention is shown in FIG. 1. First, spunbond beam 2, meltblown beam 3 and spunbond beam 4 are used to form a nonwoven web (hereinafter also referred to as "fabric" or "base fabric") 6 on conveyor belt 8. The web 6 is then bonded with calender rolls 10 and 12. According to further exemplary embodiments of the invention, plural elements corresponding to each of beams 2, 3, 4 may be incorporated in the system to form multiple respective layers of web 6—for example, depositing multiple meltblown layers to form an SMMS or SMMMS fabric. According to an exemplary embodiment of the invention, meltblown fibers may comprise between 2% and 35% of the total weight of the web 6.

According to an exemplary embodiment of the invention, a spunmelt nonwoven web is made of continuous filaments that are laid down on a moving conveyor belt 8 in a randomized distribution. Resin pellets may be processed under heat into a melt and then fed through a spinneret (or spinning beams 2 and 4) to create hundreds of filaments by use of a drawing device (not shown). As described before, multiple spinnerets or beams (blocks in tandem) may be used to provide an increased density of spunbond fibers corresponding to, for example, each of spinning beams 2 and 4. Jets of a fluid (such as air) cause the fibers from beams 2 and 4 to be elongated, and the fibers are then blown or carried onto a moving web (conveyor belt) 8 where they are laid down and sucked against the web 8 by suction boxes (not shown) in a random pattern to create a fabric structure 6. A meltblown layer may be deposited by a meltblown mechanism (or "beam") 3 between spunbond layers laid by spinning beams 2 and 4. The meltblown ("MB") layer can be meltblown, but may be formed by a variety of other known processes. For example, the meltblowing process includes inserting a thermoplastic polymer into a die. The thermoplastic polymer material is extruded through a plurality of fine capillaries in the die to form fibers. The fibers stream into a high velocity gas (e.g. air) stream which attenuates the streams of molten thermoplastic polymer material to reduce their diameter, which may be to the microfiber diameter. The meltblown fibers are quasi-randomly deposited by beam 3 over the spunbond layer laid by spinning beam 2 to form a meltblown web. Multiple dies are placed side by side in a block to generate sufficient fibers across the total width of the nonwoven fabric 6, and two or more blocks may be used in tandem in order to increase the coverage of fibers. The meltblown fibers can be tacky when they are deposited, which generally results in some bonding between the meltblown fibers of the web.

In a preferred embodiment, the fibers used to form web 6 are thermoplastic polymers, examples of which include polyolefins, polyesters (e.g., polylactic acid or "PLA"), polyamides, copolymers thereof (with olefins, esters, amides or other monomers) and blends thereof. As used herein, the term "blend" includes either a homogeneous mixture of at least two polymers or a non-homogeneous mixture of at least two physically distinct polymers such as bicomponent fibers. Preferably the fibers are made from polyolefins, examples of which include polyethylene, polypropylene, propylene-butylene copolymers thereof and blends thereof, including, for example, ethylene/propylene copolymers and polyethylene/polypropylene blends. Resins with higher crystallinity and lower break elongations may also be suitable due to likelihood to fracture with greater ease. Other formulation changes may also be employed, e.g. addition of $CaCO_3$, in order to provide a spunbond fiber that is more prone to fracture and/or permanent deformation and, thus, better aperturing. According to an exemplary embodiment of the invention, the base fabric may also comprise staple fibers and/or pulp fibers.

In an exemplary embodiment, web 6 may be thermally calender bonded via rollers 10 and 12. In addition, a degree of bonding may be imparted by the meltblown fibers (from beam 3) as a result of low pressure calendering or during the initial web formation due to the meltblown fibers staying at a sufficiently high temperature to adhere to the spunbond fibers of beams 2 and 4. One or both of the rollers 10 and 12 may have their circumferential surfaces machined, etched, engraved or otherwise formed to have thereon a pattern of protrusions and recessed areas, so that bonding pressure exerted on the web 6 at the nip is concentrated at the outward surfaces of the protrusions, and reduced or substantially eliminated at the recessed areas. According to an exemplary embodiment of the invention, rollers 10 and 12 may be a calender 10 having a bonding roll 12 defining a bond pattern. In accordance with an exemplary embodiment of the invention, the bond pattern defined by the bonding roll 12 may have a percentage bond area of 10% or greater. Commonly owned U.S. Pat. Nos. 6,537,644, 6,610,390, and 6,872,274, each of which is incorporated herein by reference, disclose nonwovens having a non-symmetrical pattern of fusion bonds (that is, an anisotropic or asymmetrical pattern). The bonds may be closed figures elongated in one direction and selected from the group consisting of closed figures (a) oriented in parallel along the one direction axis, (b) oriented transverse to adjacent closed figures along the one direction axis, and (c) oriented sets with proximate closed figures so as to form there between a closed configuration elongated along the one direction axis. Alternatively, the web 6 may be ultrasonically bonded or through-air bonded. The degree of bonding used may vary depending on the type of hydraulic treatment that is used. In an exemplary embodiment, a well-bonded SMS web 6 may be subjected to a hydraulic treatment that results in hydroengorgement of the spunbond layers with the fibers of the meltblown layer being entangled with the spunbond fibers. For an exemplary SMS web made primarily from polypropylene fibers, a "well bonded" pattern could be obtained by using a bond pressure of about 90 N/m and a temperature of about 150° C. Without being bound by theory, it is believed that the increased degree of bonding results in more uniform spunbond layers and thus improves the appearance of web 6. In another exemplary embodiment, a tack or medium bonded SMS web 6 may be subjected to a hydraulic treatment to form apertures. The web 6 may also be hydroengorged prior to being apertured. It is believed that the more moderate degree of bonding prevents the bond points from disrupting the formation of apertures while still providing enough integrity so that the fabric has a high abrasion resistance. For an SMS web made primarily from polypropylene, the moderate degree of bonding described about can be obtained using a bond pressure in the range of 20 N/m to 60 N/m.

Figure 2A:
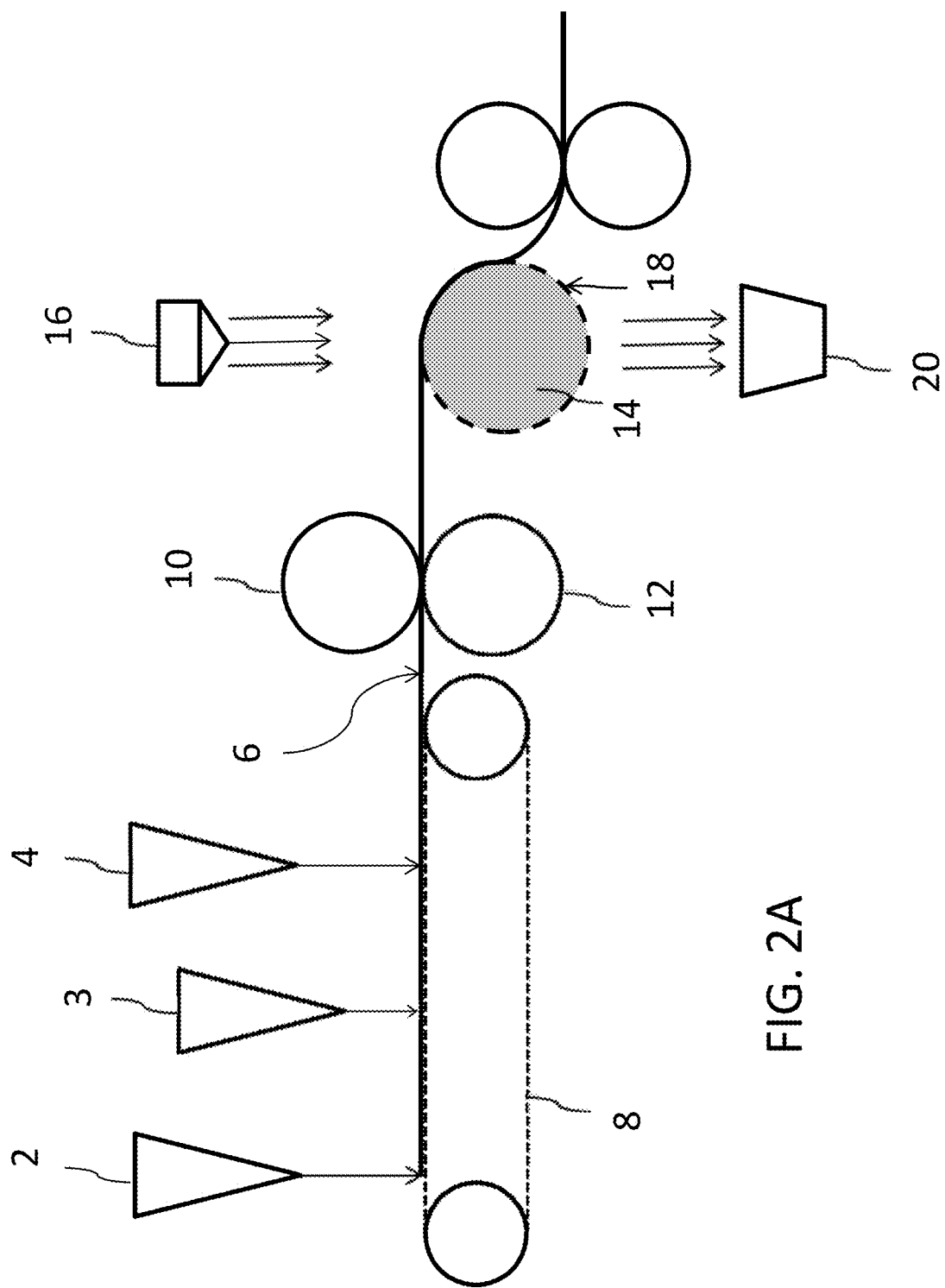
FIGS. 2A and 2B are representative diagrams of systems for hydraulically treating and/or aperturing nonwoven fabrics according to a second and a third exemplary embodiment of the present invention, respectively.

In accordance with an embodiment of the invention, web 6 is then hydraulically treated using multiple water jet injectors 16a, 16b, and 16c—each of elements 16a, 16b, and 16c illustrated in FIG. 2A may represent a set of plural injectors in a respective predetermined arrangement. According to an exemplary embodiment of the invention, a web 6 is conveyed under the injectors 16a-c by a conveyor 22, high pressure water jets act against and pass through the fabric. Corresponding water sinks, or vacuums and the like, 20a, 20b, and 20c may be positioned under the location of each injector (set) 16a-c to pull the water away and dry the fabric 6. Nonwoven web 6 may subsequently be dried by blowing hot air through the fibrous web, by IR dryers or other drying techniques (e.g., air drying).

According to an exemplary embodiment of the invention, conveyor 22 may incorporate one or more screens each with a predetermined pattern for supporting fabric/web 6 while it is being hydraulically treated by respective water injectors 16a-16c—for example, by employing one or more drums 14 with corresponding sleeves 18 that act as the one or more screens. The screen(s) may comprise an aperture pattern for imparting apertures to the fabric/web 6. According to embodiments of the invention, fewer than three sets of injectors 16a-16c may be used for hydraulically treating and/or imparting apertures to fabric/web 6. As detailed further below with reference to FIGS. 3 and 4, water injectors 16a-16c may be set to respective water pressures.

In accordance with an exemplary embodiment of the invention, pressure of about 80-200 bars may be employed for hydraulic treatment and for imparting apertures.

Figure 2B:
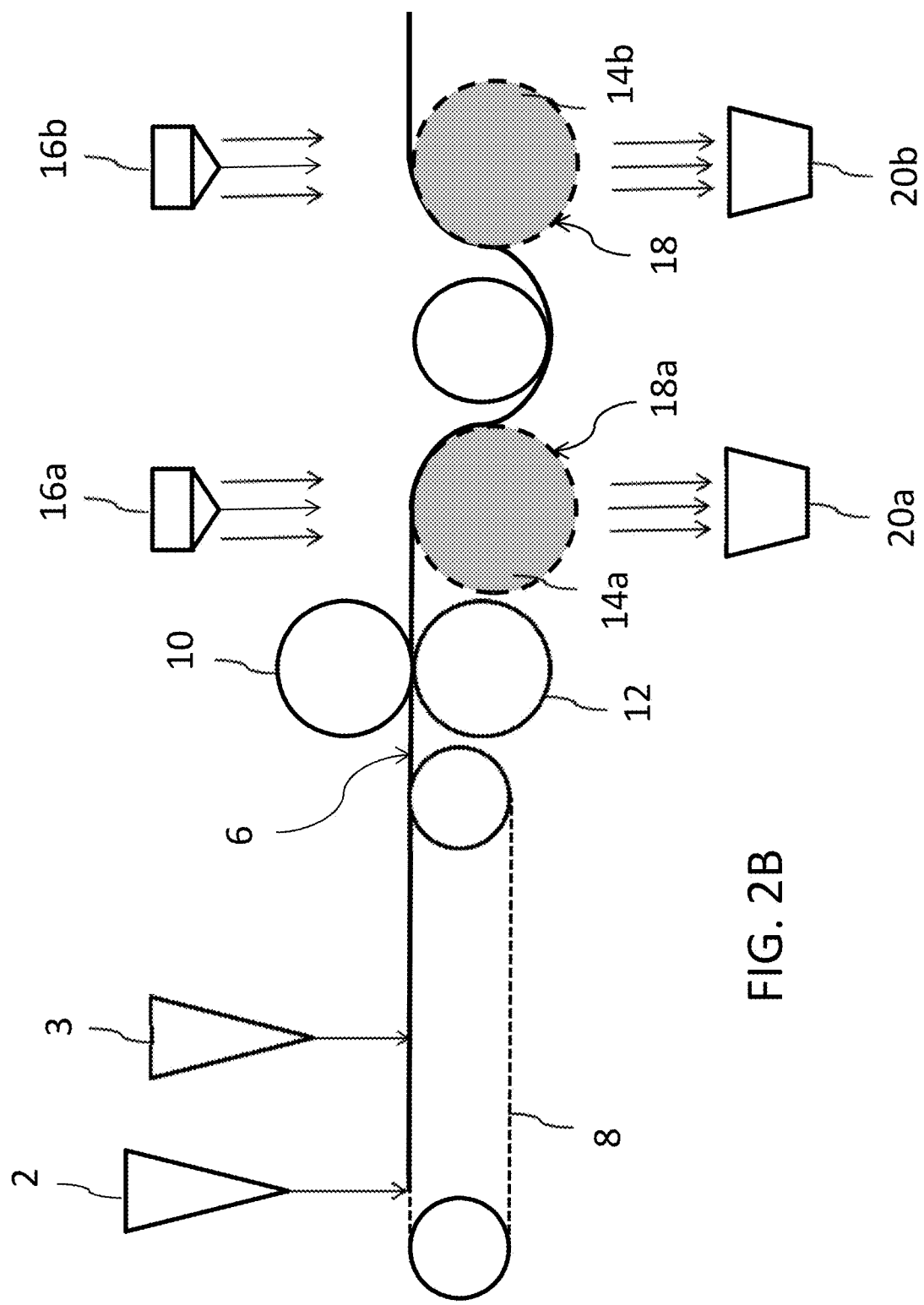

FIGS. 2A and 2B illustrate exemplary embodiments of the invention employing one or plural drums for hydraulically treating and/or imparting apertures in an SMS or an SM fabric. Like elements are labeled with the same reference numerals as those in FIG. 1 and repeated detail description of these elements is omitted here.

As shown in FIG. 2A, spunbond beam 2, meltblown beam 3 and spunbond beam 4 may be used to form base fabric 6 on conveyor belt 8. The web 6 may then be bonded with calender rolls 10 and 12. Again, according to further exemplary embodiments of the invention, plural elements corresponding to each of beams 2, 3, 4 may be incorporated in the system to form multiple respective layers of web 6—for example, depositing multiple meltblown layer to form an SMMS or SMMMS fabric. In accordance with an embodiment of the invention, base fabric/web 6 is then hydraulically treated by one or more sets of water jet injectors 16. Apertures may also then be hydraulically imparted to nonwoven web 6 using one or more drums 14 having aperture patterns and multiple water jet injectors 16. According to an exemplary embodiment of the invention, drum 14 may be covered with a sleeve 18, which may be made with metal or plastic, having a predetermined pattern for supporting fabric/web 6. According to an exemplary embodiment of the invention, the predetermined pattern may comprise an aperture pattern, where the aperture pattern may have a percentage aperture area of greater than 25%. The mean diameter of the apertures may be approximately 500-5000 microns. Web 6 is wrapped around the drum 14 and as it passes under the injectors 16, high pressure water jets act against the fabric and pass through the fabric to deform the fabric according to the pattern on the sleeve 18. A water sink or vacuum slot/area 20 may be positioned under the location of each injector 16 to pull the water away, or through the apertures, thereby treating or forming apertures in the base fabric (web 6) in a pattern corresponding to that of the sleeve 18 below the fabric 6. Nonwoven web 6 may subsequently be dried by blowing hot air through the fibrous web, by IR dryers or other drying techniques (e.g., air drying).

As shown in FIG. 2A, aperturing may be done on one drum 14 and providing at least one, preferably multiple, water jet beams (injectors 16) so that subsequent drums will not disrupt the clarity of the aperturing pattern. Subsequent drums may feature the use of lower pressure water jets to help entangle any broken fibers and/or improve web integrity without re-directing fibers or "wash" fibers across the holes.

As shown in FIG. 2B, an MB layer is deposited on an SB layer via spinning beam 2 and assembly 3. Again, plural blocks corresponding to elements 2 and 3 may be used for fiber coverage. A smooth calender roll 10 may be used to directly contact the MB layer at a lower temperature in correspondence with an engraved calender roll 12 at a higher temperature. As further shown in FIG. 2B, multiple drums 14a and 14b may be used in correspondence with water injectors 16a and 16b, sleeves 18a and 18b, and water collectors 20a and 20b to provide multiple steps for treating or imparting apertures to nonwoven web 6. According to an exemplary embodiment of the invention, an aperture pattern on sleeves 18a and 18b may be registered across drums 14a and 14b so that the aperturing could be further improved in their geometric clarity and 3D structure by using the second drum 14b. In other words, registration of the aperture pattern on sleeves 18a and 18b allows for the apertures created on the first drum 14a to be placed directly over corresponding holes on the second drum 14b. In accordance with a further exemplary embodiment, more than two sets of water injectors 16a and 16b may be employed with corresponding assemblies for accommodating such additional sets of water injectors. In embodiments, the aperture pattern may also be registered with the bond pattern so as to be substantially exclusive, namely having minimal overlap between bonds and apertures.

In embodiments, the hydraulic treatment can include up to three water injection steps of exposing web 6 to a plurality of water jets at a pressure ranges of about 80-160 bars a second. In another embodiment having three water injection steps, a subset of the water jets in the first injection step may be held at about 80 bars a second.

In embodiments, apertures of differing properties may be formed. Specifically, the size and shape of apertures may differ. For example, different sized apertures could be arrayed in a regular pattern. In some applications where the visual properties of the nonwoven differ from the visual properties of a layer beneath the nonwoven the apertures could be arranged to form a gradient or other graphical element such as a figure or shape. In embodiments, properties of the apertured nonwoven may vary as a result of differences in percent open area, frequency and size of apertures between different regions in the nonwoven. An example of such a nonwoven would be an apertured nonwoven for use as a topsheet in a diaper where the aperture diameter increases from front to back so as to improve transmission of solid matter. Alternatively, the frequency of apertures could be increased along a length of the nonwoven laminate while maintaining the aperture diameter the same.

It is preferable that the base fabric 6 is pre-heated above around 100° F. before feeding into the hydraulic treatment unit, which may comprise, among other elements, conveyor 22 (and/or drum 14), water injectors 16, and water collectors 20. Pre-heating of the web 6 could be done using a thermal calendaring unit (such as rollers 10 and 12), infrared unit, hot-air blower, or combinations thereof. Additionally, the water used in the hydraulic treatment unit—i.e., water from injectors 16—could be heated. Pre-heating of the web 6 allows the meltblown fibers to be more flexible, leading to improved characteristics and better aperture definition at lower water jet pressures and limiting fiber breakage.

In embodiments, either or both spunbond and meltblown layers have one or more in-melt hydrophilic additives added to any/all of the individual web layers. This added hydrophilicity to the base polymer web enables the individual PP filaments to absorb some amount of water during the pre-entangling stages of the hydroentangling process. Increase in water absorption allows greater flexibility leading to better aperture definition at lower water jet pressures and minimal fiber breakage.

In an exemplary embodiment, the spunbond fibers include additives to improve softness. Examples of such additives include random copolymers (e.g., Total™ 7860 (Total SA), Moplen® RP348SK (Reg. No. 0711971, from lyondellbasell under license to PolyMirae), and the like); slip additives (e.g., PolyVel® S-1519, S-2446 (Reg. No. 1423496, from PolyVel, Inc.)); and other soft additives (e.g., Techmer® PPM11790 (Reg. No. 3001764, from Techmer PM, LLC), Accurel® GA 300 (Reg. No. 1141925, from Armak Co.), or FW505, FW515 (from Keimei Plastifizierung Technik (Yantai) Co., Ltd.)). Additives, such as those described above and the like, may also be added to the MB fibers in order to modify surface feel and physical performance e.g. absorption rate. In an exemplary embodiment, a base fabric with an SMS structure includes an amount of meltblown fibers making up 2 to 30% of total web weight, more preferably 3-15% of the total web weight and most preferably about 5% of the total web weight.

In an exemplary embodiment of the invention, a second calendering step—using, for example, rollers similar to elements 10 and 12—may be employed to provide additional thermal bonding to web 6 after the aperturing process to reduce damage to web integrity and/or loose fibers. Such a step may be performed with sealing heat treatment at 130 to 150° C. and a pressure range of 30-90 N/mm. Topical treatment may also be used to minimize loose fiber ends. Alternatively, air through bonding may be used to provide additional thermal bonding.

In an exemplary embodiment, the nonwoven web resulting from the above-described process may have a Bond Area Percentage greater than 10%, preferably greater than 15%, more preferably in the range of 16%-22%, and more preferably in the range of 18%-20%. The "Bond Area Percentage" on a nonwoven web is a ratio of area occupied by bond impressions, to the total surface area of the web, expressed as a percentage, and measured according to the Bond Area Percentage method set forth herein. The method for measuring Bond Area Percentage is described in U.S. Pat. No. 8,841,507, herein incorporated by reference. The nonwoven web may also have a percent aperture area in the range of around 10%-40%. An exemplary nonwoven web has an aperture area to bond area ratio of between 3:1 and 1:1.

In embodiments, the apertures of the nonwoven web may be characterized based on specific criteria. In an exemplary embodiment, the edges of the apertures may differ from the rest of the surface of the nonwoven web in one or more of opacity, reflectance or color. In an exemplary embodiment, the nonwoven web may be laminated over a sheet such that a surface of the sheet is visible through the apertures of the nonwoven web. The sheet may be a film, nonwoven, woven fabric or a composite. In an exemplary embodiment, the areas of the sheet visible through the apertures of the nonwoven web may differ from the edges of the apertures in one or more of opacity, reflectance or color. Further, there may be a gradient of one or more of opacity, reflectance or color formed by the surface of the nonwoven web, the edges of the aperture and the area of the sheet visible through the apertures of the nonwoven web.

The nonwoven web 6 may be incorporated into a nonwoven laminate. The nonwoven laminate may include additional layers of continuous fibers such as spunbond fibers and meltblown fibers and may include composite nonwovens such as spunbond-meltblown-spunbond laminates. The nonwoven laminate may also include short fibers such as staple fibers or may include pulp fibers. These short fibers may be in the form of a consolidated web such as carded web or tissue sheet or may be initially unconsolidated. The nonwoven laminate may also include superabsorbent material, either in particulate form or in a fiberized form. The laminate may be formed through conventional means, including but not limited to thermal bonding, ultrasonic bonding, chemical bonding, adhesive bonding and/or hydroentanglement. In accordance with an embodiment of the invention, web 6 may form a nonwoven laminate resulting from the one or more processes described above for use as a topsheet, an absorbent core, or a backsheet of an absorbent article.

Examples of hydraulically treated nonwovens made in accordance with exemplary embodiments of the invention are included in the tables illustrated in FIGS. 3A, 3B, 3C, 5A, 5B and 5C. As shown therein, samples are identified by a T # (or Trial #) with a corresponding description of base nonwoven, a basis weight (BW) of the nonwoven in gsm (grams per square meter), a conveyance speed in meters per minute (mpm), a number of water injector sets used (C1, C2, and C3; with the strip configuration, water pressure (in bars), and screen configuration used for the respective water injector sets), whether a dryer is used, and a comparative rating for visual abrasion resistance of the resulting sample. The materials used for the base nonwovens in the processes for the results shown in FIGS. 3A, 3B, 3C, 5A, 5B, and 5C correspond to those shown below in Table 1 with respective numeric identifiers.

TABLE 1

| | |
|---|---|
| Material 1 | 30 gsm SMS |
| Material 2 | 30 gsm SMS |
| Material 3 | 30 gsm SMS |
| Material 4a | 30 gsm SMS |
| Material 4b | 30 gsm SMS |
| Material 5 | 35 gsm SB |

Material 1 was a 30 gsm SMS laminate with polypropylene spunbond material bonded with meltblown fibers (30% by weight) to form a 30 gsm (grams per square meter) SMS structure. Materials 2 to 4b had spunbond layers made from polypropylene with 25% Vistamaxx® 7020BF (from Exxon Mobil Corporation, Registration Number 3074180) and 2500 ppm erucamide and meltblown layers made from polypropylene. For Material 2, the laminate was 30% by weight meltblown fibers. For Material 3, the laminate was 12% by weight meltblown fibers. For Materials 4a and 4b, the laminate was 5% by weight meltblown fibers. Material 5 was a 35 gsm polypropylene spunbond fabric.

As shown in FIGS. 3A, 3B, and 3C, the materials used for the respective examples, which correspond to those identified in Table 1 above, further identify bonding conditions (tack-bonded, medium bonded, and well bonded) corresponding to the parameters below:

Material 1 (medium bonded): Engraved-roll=150° C., Smooth-roll=150° C., Pressure=60 N/mm Material 2 (tack-bonded): Engraved-roll=145° C., Smooth-roll=145° C., Pressure=30 N/mm Material 3 (tack-bonded): Engraved-roll=145° C., Smooth-roll=145° C., Pressure=30 N/mm Material 4a (tack-bonded): Engraved-roll=145° C., Smooth-roll=145° C., Pressure=30 N/mm Material 4b (Well-bonded): Engraved-roll=152° C., Smooth-roll=152° C., Pressure=90 N/mm In addition, as reflected in the Table of FIGS. 3A, 3B, and 3C, the strips and screens used with the water injector sets (C1, C2, and C3) for hydraulically treating the nonwovens are as follows:

Strip: 1R:—a metal strip perforated with one row of very small holes across its width from which the high pressure water flows creating water needles that hit the nonwoven and paper and entangle the fibers together.

Strip: 2R and 2Rb:—a metal strip perforated with two rows of very small holes across its width from which the high pressure water flows creating water needles that hit the nonwoven and paper and entangle the fibers together.

Screen—MSD: a metal sleeve that fits over the drum in the hydraulic jet-lace unit against which the hydraulic water needles are applied to the material. 100 holes/cm2 which are 300 microns in diameter. 8% open-area.

Screen—AS1: a metal sleeve with a matrix of holes which allows for the creation of a pattern into the nonwoven based on water flow through the screen—the average aperture size being 1 mm×0.5 mm, MD×CD.

Screen—AS2: a wire-mesh sleeve with a matrix of holes which allows for the creation of a pattern into the nonwoven based on water flow through the screen—the average aperture size being 0.9 mm×1.5 mm, MD×CD.

Screen—AS3: a metal sleeve with a matrix of holes which allows for the creation of a pattern into the nonwoven based on water flow through the screen—the average aperture size being 3 mm×2 mm, MD×CD.

The results shown in FIGS. 3A, 3B, and 3C relate to comfort touch parameters for these samples as compared to the base nonwovens used for the respective processes. The parameters include a resulting basis weight (BW), AP (air permeability) in cfm (cubic feet per minute), thickness, CDT (cross machine direction tensile strength) in N/cm (Newtons per centimeter), MD HOM (machine direction Handle-O-Meter) in grams (g), CD HOM (cross machine direction Handle-OMeter), Avg HOM (average Handle-O-Meter), Kinetic CoF (coefficient of friction), and "visual abrasion" resistance.

The Handle-O-Meter (HOM) stiffness of nonwoven materials is performed in accordance with WSP test method 90.3 with a slight modification. The quality of "hand" is considered to be the combination of resistance due to the surface friction and flexural rigidity of a sheet material. The equipment used for this test method is available from Thwing Albert Instrument Co. In this test method, a 100×100 mm sample was used for the HOM measurement and the final readings obtained were reported "as is" in grams instead of doubling the readings per the WSP test method 90.3. Average HOM was obtained by taking the average of MD and CD HOM values. Typically, lower the HOM values higher the softness and flexibility, while higher HOM values means lower softness and flexibility of the nonwoven fabric.

Tensile strength measurement is performed in accordance with WSP methods, more specifically WSP 110.4(05)B, using an Instron test machine. Measurement is done in both MD and CD directions, respectively. CD tensile strength (CDT)(in Newtons per centimeter (N/cm)) and elongation (CDE)(in percentage %) are reported in the results table of FIGS. 3A, 3C, and 3C.

Other reported properties such as air permeability and thickness measurements were determined in accordance with ASTM or INDA standard test methods.

The "abrasion rating" resistance parameter refers to a NuMartindale Abrasion measure of the abrasion resistance of the surface of a fabric sample and is performed in accordance with ASTM D 4966-98, which is hereby incorporated by reference. The NuMartindale Abrasion test was performed on each sample with a Martindale Abrasion and Pilling Tester by performing 40 to 80 abrasion cycles for each sample. Testing results were reported after all abrasion cycles were completed or destruction of the test sample. Preferably, there should be no visual change to the surface of the material.

For each sample, following NuMartindale Abrasion, an abrasion rating was determined based on a visual rating scale of 1 to 5, with the scale defined as follows:
5=excellent=very low to zero fibers removed from the structure.
4=very good=low levels of fibers that may be in the form of pills or small strings.
3=fair=medium levels of fibers and large strings or multiple strings.
2=poor=high levels of loose strings that could be removed easily.
1=very poor=significant structure failure, a hole, large loose strings easily removed.

As shown in FIGS. 3A, 3B, and 3C, trials 4b.9, 4b.10, and 4b.11 resulted in significant improvements in most parameters against their base nonwoven (material 4b in Table 1), most notably their abrasion ratings. As further shown in FIGS. 3A, 3B, and 3C, trials 4a.15, 4a.16, 3.9 and 3.10 also showed some improvements.

Example 1 (Trials 4b.9, 4b.10, and 4b.11 of FIGS. 3A, 3B, and 3C)

A nonwoven having an SMS structure and a basis weight of 30 gsm (grams per square meter) was used (material 4b in Table 1). The spunbond layers of the nonwoven were made from a polypropylene blend including erucamide and a propylene based elastomer. The meltblown layer comprised 5% of the total weight of the nonwoven. Samples of the nonwoven were hydraulically treated using three sets of hydraulic streams over MSD screens at conveyance speeds of 200 mpm.

For trial 4b.9, the three sets of injectors were set at respective pressures of 80 bars. For trial 4b.10, the three sets of injectors were set at respective pressures of 120 bars with the exception of one 80 bar injector. For trial 4b.11, the three sets of injectors were set at respective pressures of 160 bars with the exception of one 80 bar injector. The samples showed improved thickness (ranging between 0.284-0.358 mm vs. 0.274), CDT, HOM (particularly MD HOM), and abrasion rating. As reflected in FIGS. 3A, 3B, and 3C, all of these samples showed an abrasion rating of 5 with Avg HOM below 6.0 g (5.1 g-5.5 g). For trials 4b.10 and 4b.11, the samples further showed improved AP.

Figure 4A:
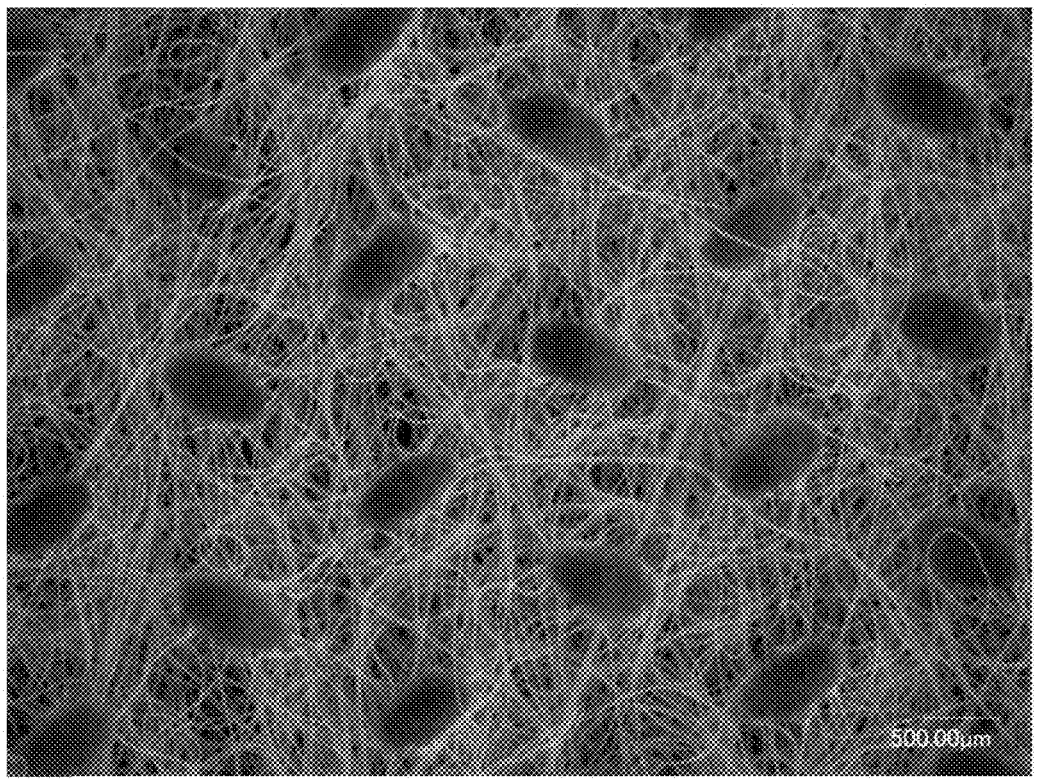
FIGS. 4A, 4B, and 4C are micrographs of nonwoven fabrics that are hydraulically-treated under process parameters and conditions reflected in FIG. 3 in accordance with exemplary embodiments of the present invention.
Figure 4B:
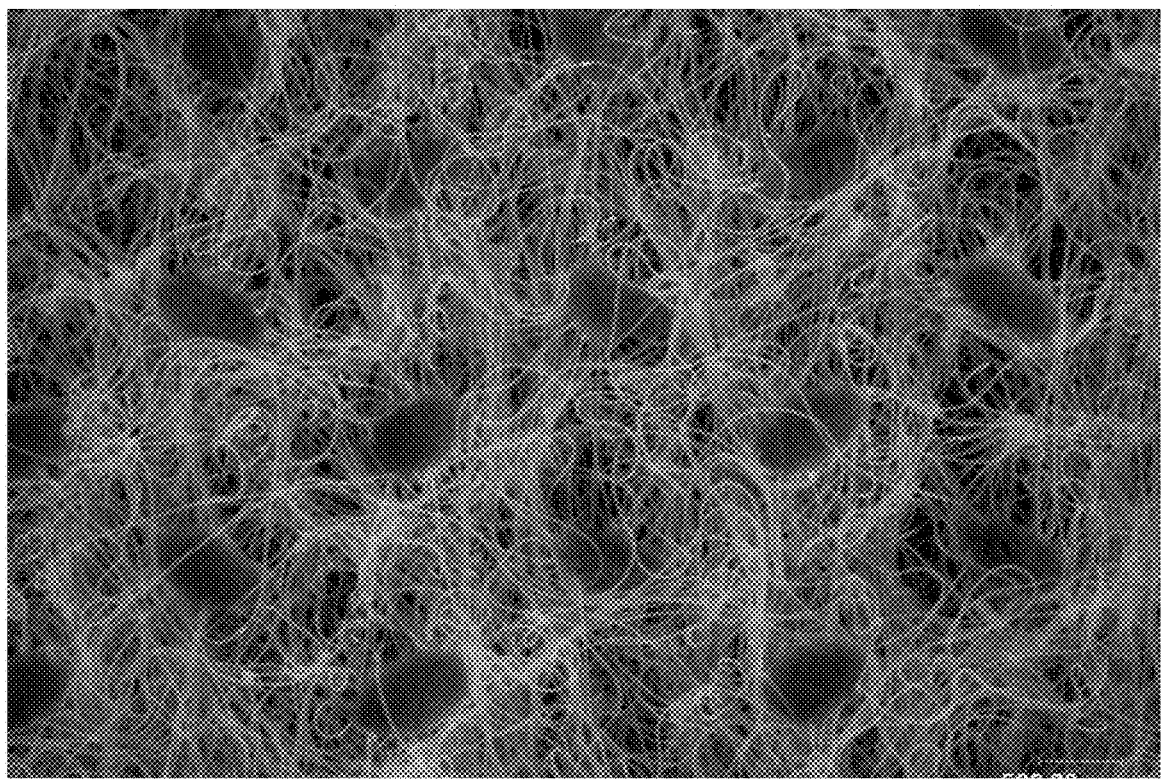
Figure 4C:
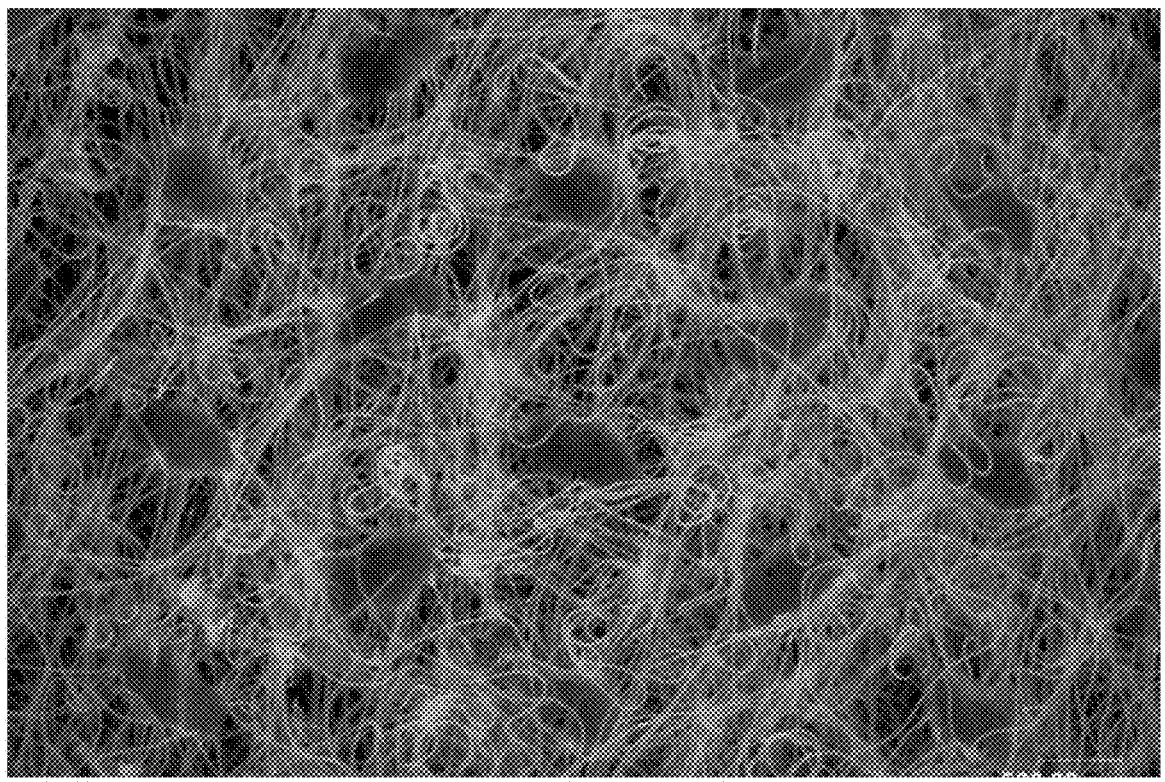

FIGS. 4A, 4B, and 4C are micrographs of nonwoven fabrics that have been hydraulically-treated under process parameters and conditions reflected in FIGS. 3A, 3B, and 3C in accordance with exemplary embodiments of the present invention. In particular, FIGS. 4A, 4B, and 4C are micrographs of nonwovens from trials 4b.9, 4b.10, and 4b.11, respectively, identified and reflected in FIGS. 3A, 3B, and 3C. As shown in FIGS. 4A-C, the nonwovens comprise particularly desirable fiber bonding and entanglement.

FIGS. 5A, 5B, and 5C show a table of results for samples, identified by Trial # (or T #), that showed particularly positive aperture characteristics, as reflected by a high comparative rating for such aperture characteristics. The table of FIGS. 5A, 5B, and 5C further illustrates additional characteristics of the resulting apertured nonwoven samples. As shown in FIGS. 5A 5B, and 5C, samples of material 5 were bonded at modified parameters associated with "tacked-bonded" defined above—namely, at 45 N/mm—and at 130 to 150° C. Other samples were also prepared at bonding pressures ranging 30-90 N/mm.

Corresponding to FIGS. 5A, 5B, and 5C, the below Table 2 shows the screens (Screen ID) used for the water injection processes according to exemplary embodiments of the invention, with corresponding aperture sizes.

TABLE 2

| Screen ID | Aperture size, MD × CD, mm |
|---|---|
| AS1 | 1 × 0.5 |
| AS2 | 0.9 × 1.5 |
| AS3 | 3 × 2 |

Example 2 (Trial 2.4 of FIGS. 5A, 5B, and 5C)

A nonwoven having an SMS structure and a basis weight of 30 gsm (grams per square meter) was used, specifically material 2 in Table 1 described above. The sample nonwoven was hydraulically treated using two sets of hydraulic streams over MSD screens at respective pressures of 60 and 80 bars and a third set of hydraulic streams over AS1 screens at 100 bars at a conveyance speed of 50 mpm. The sample showed good apertures and an abrasion rating of 4, with Avg HOM below 6.0 g (5.29 g).

Example 3 (Trial 4a.9 of FIGS. 5A, 5B, and 5C)

A nonwoven having an SMS structure and a basis weight of 30 gsm (grams per square meter) was used, specifically material 4a in Table 1 described above. The sample nonwoven was hydraulically treated using two sets of hydraulic streams over MSD screens at respective pressures of 60 and 80 bars and a third set of hydraulic streams over AS2 screens at 150 bars at a conveyance speed of 50 mpm. The sample showed good apertures and an abrasion rating of 3, with Avg HOM below 6.0 g (5.19 g).

Example 4 (Trial 3.7 of FIGS. 5A, 5B, and 5C)

A nonwoven having an SMS structure and a basis weight of 30 gsm (grams per square meter) was used, specifically material 3 in Table 1 described above. Samples of the nonwoven were hydraulically treated using two sets of hydraulic streams over MSD screens at respective pressures of 60 and 80 bars and a third set of hydraulic streams over AS2 screens at 150 bars at a conveyance speed of 50 mpm. The sample showed acceptable apertures and an abrasion rating of 3, with Avg HOM below 6.0 g (4.67 g).

Figure 6:
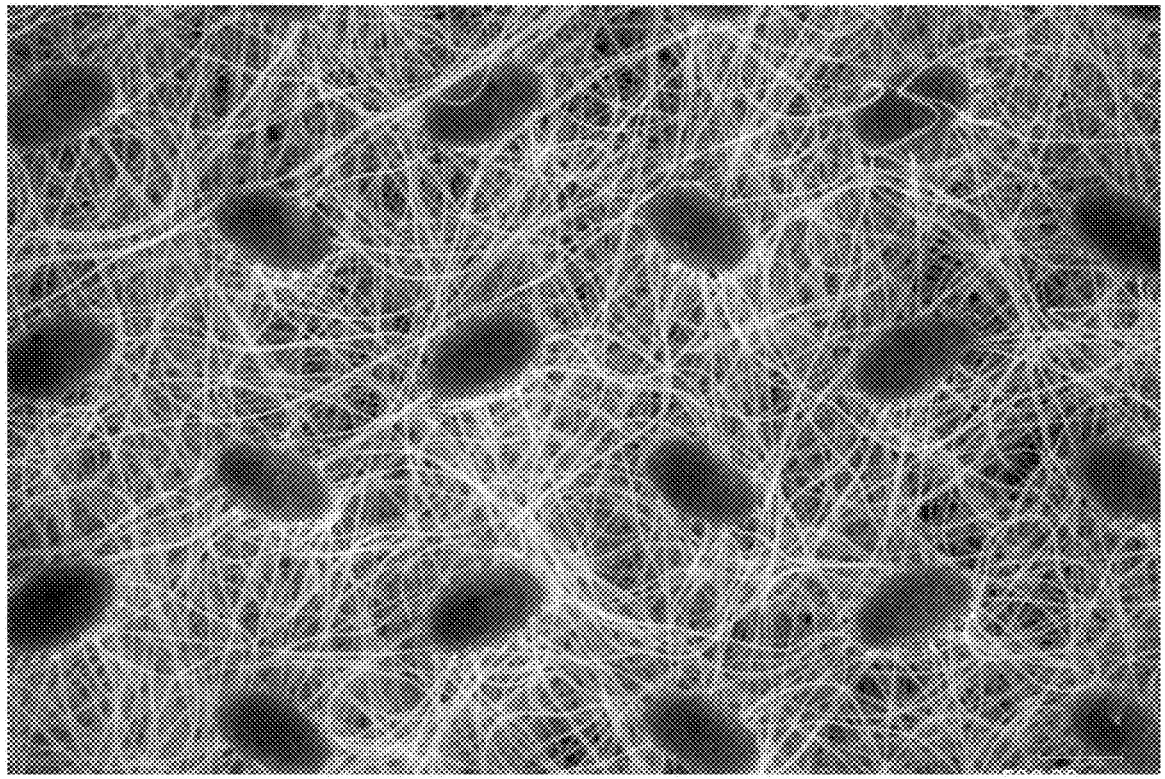
FIG. 6 is a micrograph of a nonwoven that was tested and compared to the exemplary of FIGS. 4A-C.

FIG. 6 is a micrograph of a nonwoven that was tested and compared to the exemplary nonwovens from trials 4b.9, 4b.10, and 4b.11 of FIGS. 4A-C. As shown in FIG. 6, the nonwoven has inferior fiber bonding and entanglement compared to those shown in FIGS. 4A-C.

Figure 7A:
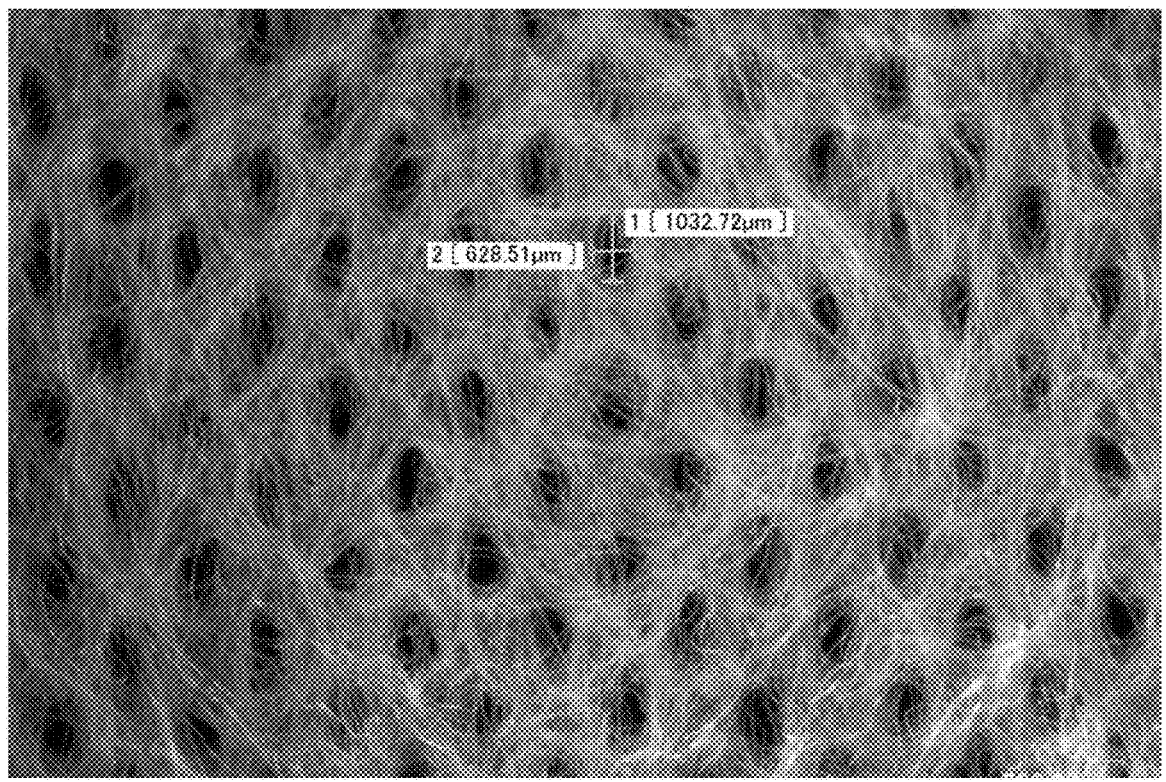
FIGS. 7A, 7B, and 7C are micrographs of nonwoven fabrics that are hydraulically-apertured under process parameters and conditions reflected in FIG. 5 in accordance with exemplary embodiments of the present invention.
Figure 7B:
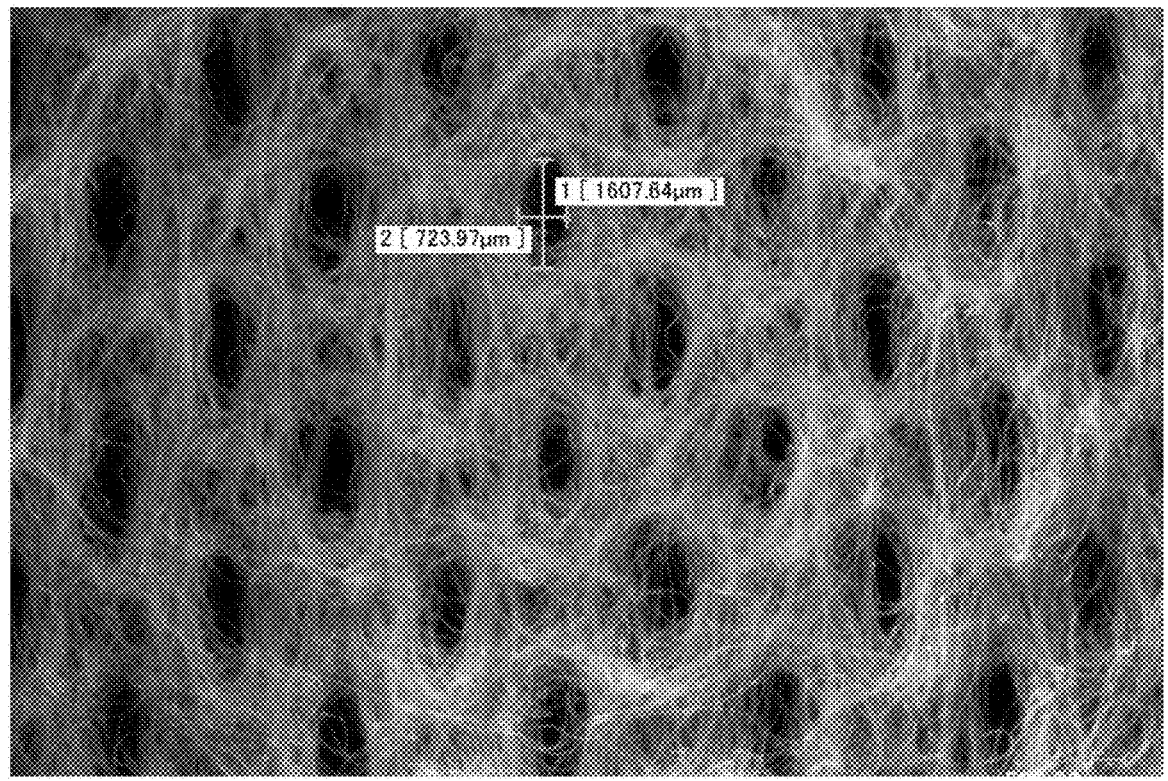
Figure 7C:
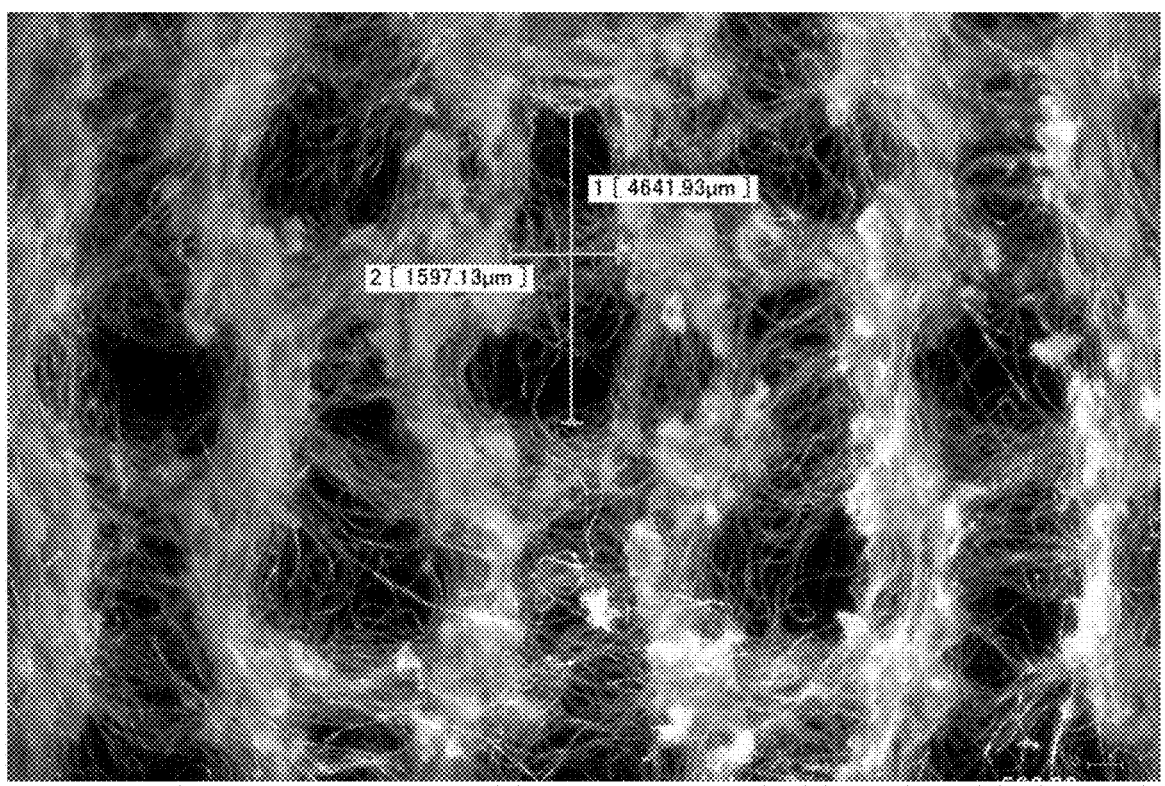

FIGS. 7A, 7B, 7C are micrographs of nonwoven fabrics that are hydraulically-apertured under process parameters and conditions reflected in FIGS. 5A, 5B, and 5C in accordance with exemplary embodiments of the present invention. In particular, FIGS. 7A, 7B, and 7C illustrate representative samples of nonwovens hydraulically apertured with screens AS1, AS2, and AS3, respectively.

Example 5 (FIGS. 8A, 8B, 8C, 8D, and 8E)

FIGS. 8A, 8B, 8C, 8D, and 8E show a table of additional results for examples of hydraulically-treated nonwovens made in accordance with exemplary embodiments of the invention. FIGS. 8A, 8B, 8C, 8D, and 8E further include results for a control sample using a base nonwoven that is not hydraulically treated. As shown therein, the base nonwovens were 22 gsm SMS with 5% MB and well-bonded (well-bonded as defined above). In particular, "SMS" included 15% Vistamaxx® (7020BF) and 2000 ppm erucamide in the spunbond (SB) layers; "SMS 1" included 5000 ppm erucamide in the meltblown (MB) layer and 15% Vistamaxx®, 2000 ppm erucamide in the SB layers; and "SMS 2" included 25% Vistamaxx®, 2000 ppm erucamide in the SB layers. As shown in FIGS. 8A, 8B, 8C, 8D, and 8E, a first control sample was not subjected to water treatment and other samples were subjected to 4 sets of 2Rb water jets strips (as defined above) at respective pressures between 80-200 bars against MSD screens (as defined above).

FIGS. 8A, 8B, 8C, 8D, and 8E show the basis weight (BW) of the nonwoven in gsm (grams per square meter), the thickness in millimeters (mm), density in grams per cubic centimeter (g/cc), air permeability ("AirPerm") in cfm, MD tensile strength, MD elongation, CD tensile strength, and CD elongation of the samples.

Handle-O-Meter (HOM) stiffness of the samples were measured in accordance with the above-described method and all samples showed desirable average HOM of below 6.0 g, as shown in FIGS. 8A, 8B, 8C, 8D, and 8E. All of the samples showed significantly improved average HOM against the untreated control sample (4.4 g vs. 2.7-3.3 g), and especially improved CD HOM (3.5 g vs. 1.0-1.7 g). In addition, all samples demonstrated desirable visual abrasion with 4.9-5.0 ratings in accordance with the above-described scale over 80 cycles, which were comparable to improved against the untreated control sample. Additionally, these samples were measured for opacity and showed desirable opacity of above 40%, comparable to improved against the untreated control sample (42.5% vs. 41.9%-47.0%). The opacity was measured in accordance with IVDA 60.1-92.

While in the foregoing specification a detailed description of specific embodiments of the invention was set forth, it will be understood that many of the details herein given may be varied considerably by those skilled in the art without departing from the spirit and scope of the invention.

The invention claimed is:

1. A nonwoven laminate, comprising:
   first and second outer nonwoven layers comprising spunbond fibers; and
   a third inner nonwoven layer comprising meltblown fibers,
   wherein the nonwoven laminate is thermally bonded with a regular bond pattern having a percentage bond area of 10% or greater,
   the nonwoven laminate is hydraulically treated,
   the basis weight of the third inner layer is at least 5 grams per square meter (gsm); and
   the nonwoven laminate has an abrasion rating of 4.0 or higher and an average Handle-O-Meter measurement (HOM) of 6.0 grams (g) or lower, wherein Handle-O-Meter is measured in accordance with a modified WSP test method 90.3 and the average Handle-O-Meter is obtained by taking the average of machine direction and cross direction HOM values.

2. The nonwoven laminate of claim 1, wherein the nonwoven laminate is hydroengorged.

3. The nonwoven laminate of claim 1, wherein the basis weight of the third inner layer is at least 10 grams per square meter.

4. The nonwoven laminate of claim 1, wherein the spunbond fibers of the first and second outer nonwoven layers comprise polypropylene and at least 5% by weight of a propylene based elastomer.

5. The nonwoven laminate of claim 1, wherein the fibers of at least one of the nonwoven layers comprises a slip agent.

6. The nonwoven laminate of claim 1, wherein the nonwoven laminate comprises a plurality of apertures.

7. A method of making the nonwoven laminate of claim 1, comprising:
   forming the first nonwoven web comprising continuous spunbond fibers;
   forming the second nonwoven web comprising continuous meltblown fibers;
   forming the third nonwoven web comprising continuous spunbond fibers;
   thermally bonding the first, second and third nonwoven webs at a pressure of between 20 newtons per meter (N/m) and 60 N/m for the nonwoven laminate with the regular bond pattern;
   and hydraulically treating the nonwoven laminate.

8. The method of claim 7, wherein the step of hydraulically treating comprises imparting one or more aperture patterns by a plurality of steps of water injection, each over a corresponding screen having a predetermined pattern, the plurality of water injection steps comprising:
   a first water injection step of exposing the laminate to a plurality of water jets at a first pressure range of about 80-160 bars;
   a second water injection step of exposing the laminate to a plurality of water jets at a second pressure range of about 80-160 bars; and
   a third water injection step of exposing the laminate to a plurality of water jets at a third pressure range of about 80-160 bars,
   wherein the first water injection step further comprises maintaining a subset of the plurality of water jets at 80 bars, and
   wherein the nonwoven laminate comprises about 5% meltblown fibers by weight.

9. The method of claim 8, wherein the one or more aperture patterns are registered so that at least a first aperture formed in the nonwoven web by imparting a first aperture pattern is formed in a same location as at east a second aperture formed in the nonwoven web by imparting a second aperture pattern.

10. The method of claim 9, wherein the first and second aperture differ in size.

11. The method of claim 10, wherein at least a third aperture formed in the nonwoven web by imparting the second aperture pattern is formed in a location where no aperture is formed in the nonwoven web by imparting the first aperture pattern.

\* \* \* \* \*